US012277833B1

(12) United States Patent
Collett et al.

(10) Patent No.: US 12,277,833 B1
(45) Date of Patent: Apr. 15, 2025

(54) PLAYER CONTROLLED CULLING OF VIDEO FRAGMENTS OF STITCHED VIDEO DRAW GAMES

(71) Applicant: Inspired Gaming (UK) Limited, Staffordshire (GB)

(72) Inventors: Steven Collett, Burton upon Trent (GB); Simon R. Twigg, Bangor (GB); Kenneth E. Irwin, Jr., Dawsonville, GA (US)

(73) Assignee: INSPIRED GAMING (UK) LIMITED, Staffordshire (GB)

(*) Notice: Subject to any disclaimer, the term of this patent is extended or adjusted under 35 U.S.C. 154(b) by 0 days.

(21) Appl. No.: 18/928,614

(22) Filed: Oct. 28, 2024

(51) Int. Cl.
*G07F 17/32* (2006.01)
*G06F 7/58* (2006.01)

(52) U.S. Cl.
CPC .......... *G07F 17/3225* (2013.01); *G06F 7/588* (2013.01)

(58) Field of Classification Search
CPC ....... G07F 17/3225; G07F 17/32; G06F 7/588
USPC .......................................................... 463/42
See application file for complete search history.

(56) References Cited

U.S. PATENT DOCUMENTS

| | | | |
|---|---|---|---|
| 4,582,324 A | 4/1986 | Koza et al. | |
| 6,193,605 B1 | 2/2001 | Libby et al. | |
| 6,331,143 B1 | 12/2001 | Yoseloff | |
| 8,608,560 B1 | 12/2013 | Perrone et al. | |
| 9,266,017 B1 | 2/2016 | Parker et al. | |
| 9,426,543 B1 | 8/2016 | Li et al. | |
| 9,451,180 B2 | 9/2016 | Mo et al. | |
| 10,210,700 B2 | 2/2019 | Metelko et al. | |
| 10,322,339 B2 | 6/2019 | Metelko et al. | |
| 10,755,521 B1 | 8/2020 | Hamman et al. | |
| 11,238,619 B1 | 2/2022 | Perez, III et al. | |
| 11,995,947 B2 | 5/2024 | Collett et al. | |
| 2003/0027621 A1 | 2/2003 | Libby et al. | |
| 2003/0087683 A1 | 5/2003 | Gatto et al. | |
| 2008/0274798 A1* | 11/2008 | Walker ................ | G07F 17/3237 463/43 |

(Continued)

FOREIGN PATENT DOCUMENTS

| | | |
|---|---|---|
| JP | 2018520772 A | 8/2018 |
| KR | 20180124084 A | 11/2018 |
| WO | 2017004433 A1 | 1/2017 |

OTHER PUBLICATIONS

International Search Report with Written Opinion issued Feb. 2, 2023 in PCT Application No. PCT/IB2022/058784.

*Primary Examiner* — Pierre E Elisca
(74) *Attorney, Agent, or Firm* — Panitch Schwarze Belisario & Nadel LLP

(57) ABSTRACT

A method and device are disclosed for pseudorandomly generating a streamed video presentation of a draw game from a plurality of previously recorded video fragments. After all wagering is concluded, a random number generator determines the outcome of the drawing. The method and device enable the automated generation of a lifelike video draw game by culling a set of video fragments from a larger plurality, with the culling process at least partially determined by a feedback loop of player preferences. After the culling process is completed, a random number generator pseudorandomly selects video fragments from the culled set creating various scenes comprising the streamed video presentation.

20 Claims, 13 Drawing Sheets

(56) References Cited

U.S. PATENT DOCUMENTS

| | | |
|---|---|---|
| 2009/0208181 A1* | 8/2009 | Cottrell ................. A63F 13/497 |
| | | 386/278 |
| 2013/0029741 A1 | 1/2013 | Kuhn |
| 2014/0101551 A1* | 4/2014 | Sherrets ............... G11B 27/031 |
| | | 715/723 |
| 2014/0324616 A1 | 10/2014 | Proietti et al. |
| 2016/0059135 A1 | 3/2016 | Wright et al. |
| 2017/0072309 A1 | 3/2017 | Perry et al. |
| 2018/0330574 A1 | 11/2018 | Wright et al. |
| 2020/0066090 A1 | 2/2020 | Green et al. |
| 2020/0125600 A1 | 4/2020 | Jo |
| 2021/0258485 A1 | 8/2021 | Cheng et al. |
| 2021/0299575 A1 | 9/2021 | Stafford et al. |
| 2021/0327220 A1 | 10/2021 | Paradise |
| 2021/0352362 A1 | 11/2021 | Moore et al. |
| 2022/0203228 A1 | 6/2022 | Wiggeshoff |
| 2022/0222470 A1 | 7/2022 | Hropak et al. |
| 2022/0222888 A1 | 7/2022 | Kennedy |
| 2022/0237996 A1 | 7/2022 | Hodge et al. |
| 2024/0321045 A1 | 9/2024 | Nelson et al. |
| 2024/0321058 A1 | 9/2024 | Nelson et al. |

\* cited by examiner

PLAYER CONTROLLED CULLING OF VIDEO FRAGMENTS OF STITCHED VIDEO DRAW GAMES

CROSS-REFERENCE TO RELATED APPLICATIONS

This application is related to U.S. patent application Ser. No. 18/928,583 filed Oct. 28, 2024 entitled "RANDOM NUMBER GENERATION FOR STITCHED VIDEO DRAW GAME SYSTEMS"; U.S. patent application Ser. No. 18/928,596 filed Oct. 28, 2024 entitled "DUAL SECTOR AUTHENTICATION OF STITCHED VIDEO DRAW GAME SYSTEMS"; U.S. patent application Ser. No. 18/928,622 filed Oct. 28, 2024 entitled "CULLING VIDEO FRAGMENTS TO PRODUCE STITCHED VIDEO GAMES"; and U.S. patent application Ser. No. 18/928,632 filed Oct. 28, 2024 entitled "COMMUNICATIONS INTEGRITY OF STITCHED VIDEO DRAW GAME SYSTEMS."

FIELD OF THE INVENTION

The present invention relates to a system, method, and device for randomly generating video streams of a draw game from a plurality of previously recorded video fragments. Specifically, the inherent aspects of this invention enable the automated generation of a lifelike video draw game with the outcome determined by a random number generator after all betting is concluded. While the systems and methods disclosed with the present invention could be of utility to any type of game with an outcome in the future (e.g., sporting events, craps, backgammon), the benefits are particularly significant for money wheels, dice wheels, and roulette wheels.

BACKGROUND OF THE INVENTION

The first online gaming (i.e., Internet gambling) venue was opened to the general public in October 1994, operated by the Liechtenstein International Lottery. In 1996, the online casino InterCasino was the first to offer online roulette wagering. By 2008, several hundred casinos offered roulette games and other forms of wagering. Now the global online gaming market is worth around $40 billion annually.

Recently, Internet casino game streaming has become popular with players watching human croupiers, providing enhanced online gameplay experiences. Casino game streaming hosts draw in audiences in their thousands, allowing players to routinely wager outside of a brick-and-mortar casino environment. This evolution has significantly affected how online casinos operate and has ushered in a broader audience reach beyond the traditional gambling community.

As is typical when new online gaming forums develop, there have been various problems impacting online games, particularly casino game streaming. Possibly due to the monotony of online casino game streaming, several live casino game croupiers have been reported to denigrate their viewing audiences during long shifts. Additionally, there have been documented instances with established online casinos (e.g., bet365) where wagers were being accepted when the outcome of a game was already known.

Many of these problems can be traced to human error. Thus, one possible solution would be automating casino game streaming, eliminating the human element. Several attempts have been made to fully automate video wagering game presentation in the past.

One of the first attempts is disclosed in U.S. Pat. No. 4,582,324 (Koza et al.) originally assigned to Bally Manufacturing Corporation that teaches compiling prerecorded short video and audio sequences to form a game sequence in which the outcome is predetermined by a prize structure stored in memory. However, Koza et al. discloses displaying compiled video and audio sequences on a video game terminal (e.g., FIG. 2 of Koza et al.) and consequently is completely silent on the intricacies and nuances of casino game streaming over the Internet.

More recently, U.S. Pat. No. 11,995,947 (Collett et al.) assigned to Inspired Gaming (UK) Limited discloses stitching together a sequence of video and audio fragments into various phases of a casino game streaming service where the outcome is determined by a Random Number Generator (RNG) only after the betting phase (i.e., no more bets are allowed) is closed. While Collett et al. provides an overview of operating a casino game streaming service, the disclosure does not provide specific details of functional components necessary to ensure proper operation under all circumstances.

Therefore, developing detailed systems, techniques, and methodologies for providing a casino game streaming service over the Internet is highly desirable. Ideally, these mechanisms would also be modular and support variations in different forms of gaming. The present invention essentially eliminates or solves the problems associated with casino game streaming services.

SUMMARY OF THE INVENTION

A general aspect of the present invention relates to providing a casino game streaming system comprised of a plurality of pseudorandomly selected video fragments of casino games featuring human croupiers. These systems typically involve money wheel or roulette games, where players can see and interact with the casino game stream.

The general aspect of the present invention can typically be divided into four functional phases.

In phase zero the player logs on, authenticating with a first sector of the video casino game system. After this first sector authentication, the player selects the game he or she has decided to play. When the player selects a particular game, another authentication process ensues with a second sector of the video casino game system. This second sector authentication process thus allows for the first sector outward facing authentication process to be optionally isolated from the internal second sector betting process authentication. This creates a system architecture where the two authentication processes can effectively be "sandboxed" from each other.

Phase one can be considered a preamble where the players make whatever wagers for the upcoming drawing (e.g., wheel spin) they choose. During this preamble phase, the video casino game stream typically comprises a series of pseudorandomly selected video fragments depicting a croupier waiting to spin the money or roulette wheel. The Random Number Generator (RNG) driven pseudorandom selection of video fragments during this preamble phase provides variety for repeat players with no particular outcome preselected. If the player selected a game that is in progress, the player will not be able to make a wager until the previous game is completed and a new game begins.

Phase two is the "No More Bets" phase. As its name implies, this is the period when betting is stopped before the drawing. At this phase, the video casino game stream typically comprises a series of pseudorandomly selected video fragments informing players that no more bets will be accepted. The "No More Bets" video stream will persist for a short time period. During this period, the system will debit each player's wallet that is currently connected to the system, thereby consummating their wagers. After all wagers are consummated, the system will determine the winning outcomes from a call to the RNG, with subsequent calls to the same RNG determining the pseudorandomly selected video fragments that reveal the winning outcomes to the players.

Finally, during phase three, the video casino game stream reveals the winning outcomes to the players. During this period, the winning players' accounts are credited with their winnings.

Thus, this general aspect of the invention of the casino game stream system involves the systematic phasing of the game streams and wagering processes coupled with pseudorandomly selected video fragments, which creates a realistic lifelike video stream while completely automating the entire process. This automated process also securely controls player authentication, financial transactions, player connectivity, and any latency that may emerge across the plurality of player communications channels.

In one specific preferred embodiment of the general aspect, when the player selects a game during the phase one preamble period, a secure token is generated to identify the player to other portions of the casino game stream system. This token contains the necessary credentials for the current login session and is used by other portions of the system to uniquely identify the player and ultimately ensure that the player has sufficient funds to place a wager. The generated secure token information is passed to a Bet Management System (BMS), which is a game computer module that is embodied in a separate portion of the casino game stream system. In this embodiment, the BMS then performs a second authentication of the player with the player's digital wallet. Optionally and preferably, the digital wallet returns a new secure token with a player Identification (ID) to the BMS. The returned token will then be utilized by the BMS for all wagers during the player's login session.

In another specific embodiment of the general aspect, the casino game stream system performs a connection check for all active players shortly after phase two (i.e., "No More Bets") commences. During this connection check process, the BMS loops through each player to ensure they remain connected to the system. If a player remains connected, the BMS debits the player's wallet for the cost of the wager(s) at that time. If the BMS determines that a player is disconnected, the system will not process their wager—i.e., the system will not debit the player's wallet with their bet essentially voided. In a scenario where a player's bet is successfully placed in the BMS, but the player is later disconnected during phase two, winnings will nonetheless be credited to the player's wallet balance.

In another preferred embodiment, the casino game stream system RNG, queried in phases one and two, is a deterministic Pseudorandom Number Generator (pRNG) such as a Mersenne Twister. With this preferred embodiment, the pRNG is reseeded periodically (e.g., once per game) from an outside source (e.g., truncated time in milliseconds of the previous game session). Optionally, each new seed can be encrypted with a digital key known only to the casino game stream system with the resultant ciphertext being employed as the pRNG seed.

In all of these embodiments, completely automatic, realistic, lifelike video streams are provided interactively to players, simulating a live casino experience. The essential concept of the invention is to provide a reliable and secure Internet gaming platform to players, at least partially comprised of pseudorandomly selected video fragments of casino games featuring human croupiers with sufficient complexity and variability that every game will appear to be unique and not prerecorded.

Objects and advantages of the invention will be set forth in part in the following description or may be apparent from the present description, or may be learned through practice of the invention. Described are a number of mechanisms and methodologies that provide practical details for reliably and securely allowing a player to interact with a simulated game streaming environment. Although the examples provided herein are primarily related to roulette and money or dice wheels, it is clear that the same methods apply to any type of draw game wagering.

BRIEF DESCRIPTION OF THE DRAWINGS

The foregoing summary, as well as the following detailed description of the invention, will be better understood when read in conjunction with the appended drawings. For the purpose of illustrating the invention, the embodiments that are presently preferred are shown in the drawings. It should be understood, however, that the invention is not limited to the precise arrangements and instrumentalities shown. In the drawings.

DETAILED DESCRIPTION OF THE INVENTION

Figure 1A:
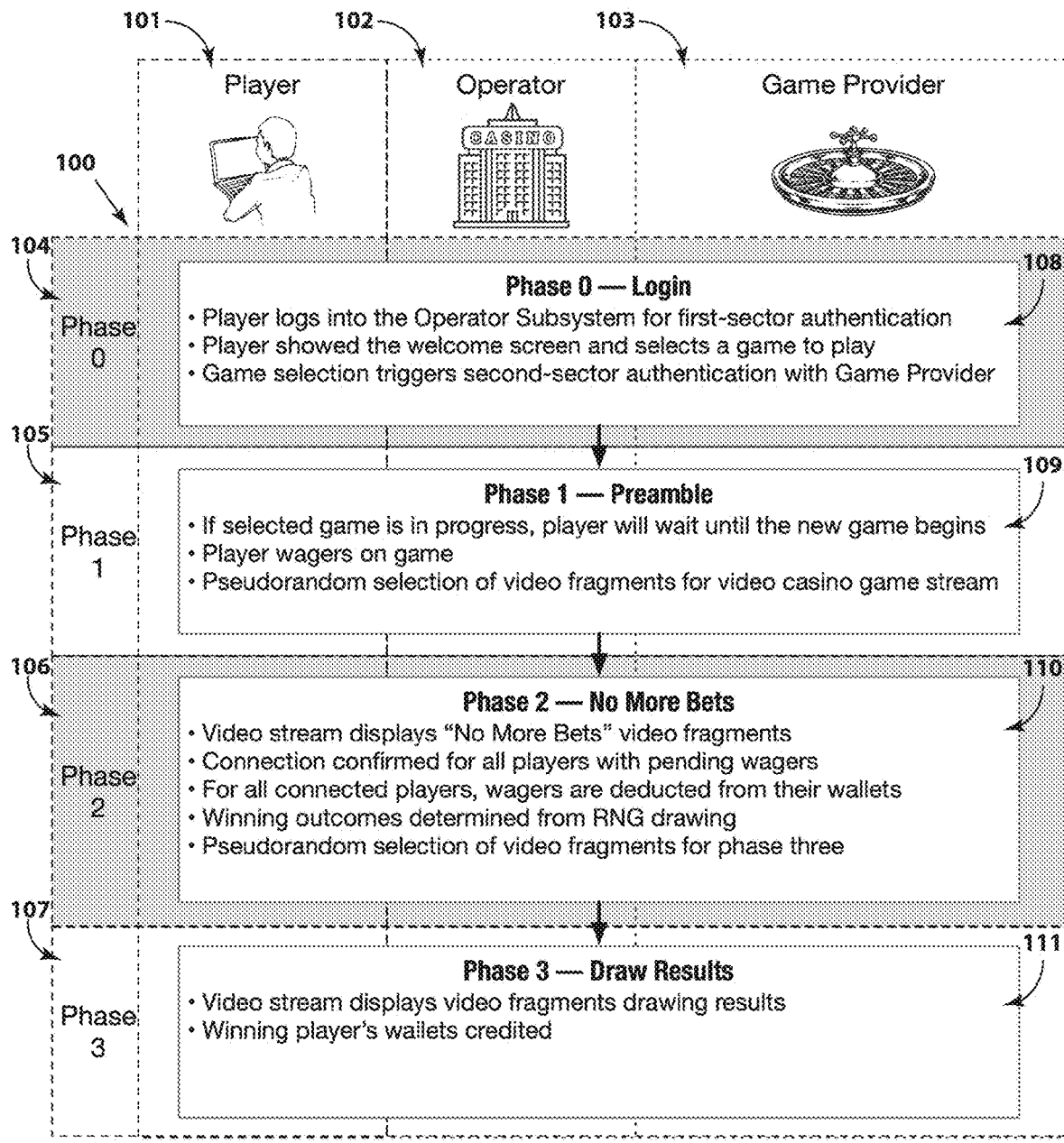
FIG. 1A is an overall matrix block diagram representative example providing a schematic graphical overview of a general embodiment of a casino game stream system as the entities interact with each phase.

Certain terminology is used herein for convenience only and is not to be taken as a limitation on the present invention. The words "a" and "an", as used in the claims and in the corresponding portions of the specification, mean "at least one."

The term "draw game" refers to any type of game where wagers are placed on an outcome sometime in the future. Thus, a draw game could be a game of roulette, dice, or a Lotto-style ping pong ball drawing.

A "video fragment" is a short (e.g., two seconds) video and audio sequence that is a portion of a "video take." A "video take" is a portion of a scene wherein the same scene is recorded (filmed) multiple times. A video take is analogous to "takes" when filming a movie where the dialogue, movement, and interaction of the actors and background scenery will generally be the same but will differ in subtle or significant ways from each other. With this disclosure, a pseudorandomly selected series of video fragments are dynamically stitched together to create various video takes with a plurality of video takes comprising a "scene." The term "Video Store" is used for brevity to mean the database where the video fragments are arranged and saved for dynamic stitching into takes and scenes. In some embodiments, the video store can also be used to save generated video takes and scenes. A video "ruleset" is a set of instructions for a given croupier "group" (e.g., an arrangement of different video fragments or takes of the same croupier) such that the resultant video stream will appear coherent (e.g., the same croupier appearing throughout the draw game, the appearance of time passing in a normal manner) to a player.

The terms "Random Number Generator" or "RNG" are used for brevity to include all forms of random number generation. For example, "True Random Number Generator" or "TRNG," "Pseudo Random Number Generator" or "pRNG" (e.g., Mersenne Twister algorithms, "Linear Congruential Generators" or "LCGs"), etc. could all be referred to as RNGs in this disclosure.

The terms "WebSocket" and "socket" are used interchangeably throughout this specification and associated claims to refer to an Internet communications protocol providing a simultaneous two-way communication channel over a single Transmission Control Protocol (TCP) connection. Also, the terms "source device" and "apparatus" are also used interchangeably herein. Finally, the term "video" is often used for brevity throughout this disclosure to mean both video and the associated audio embedded in a video fragment, take, or scene.

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as come within the scope and spirit of the invention.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

Figure 1B:
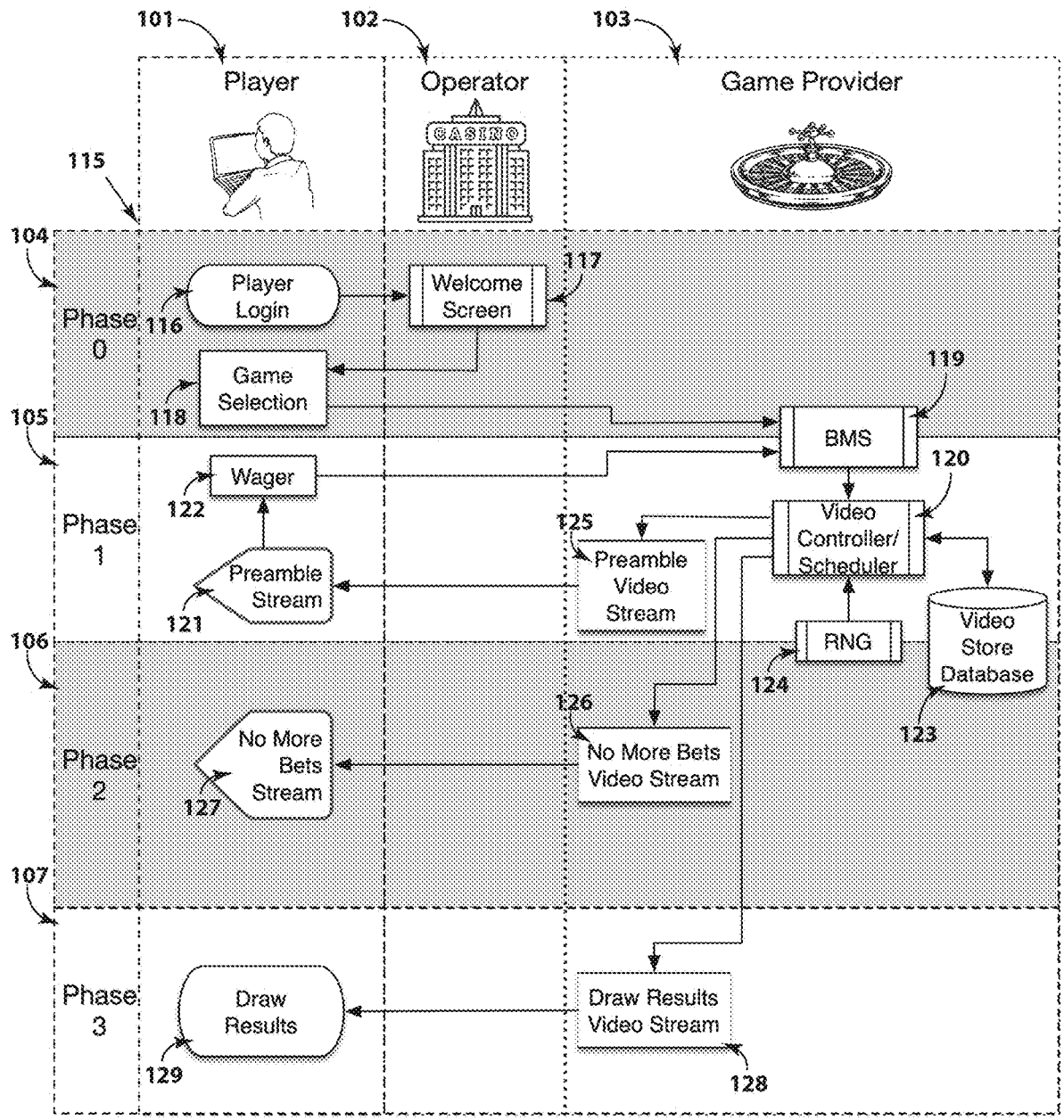
FIG. 1B is a matrix block diagram representative example providing a schematic graphical overview of pseudorandomly assembling video fragments into a casino game stream system compatible with FIG. 1A.
Figure 1C:
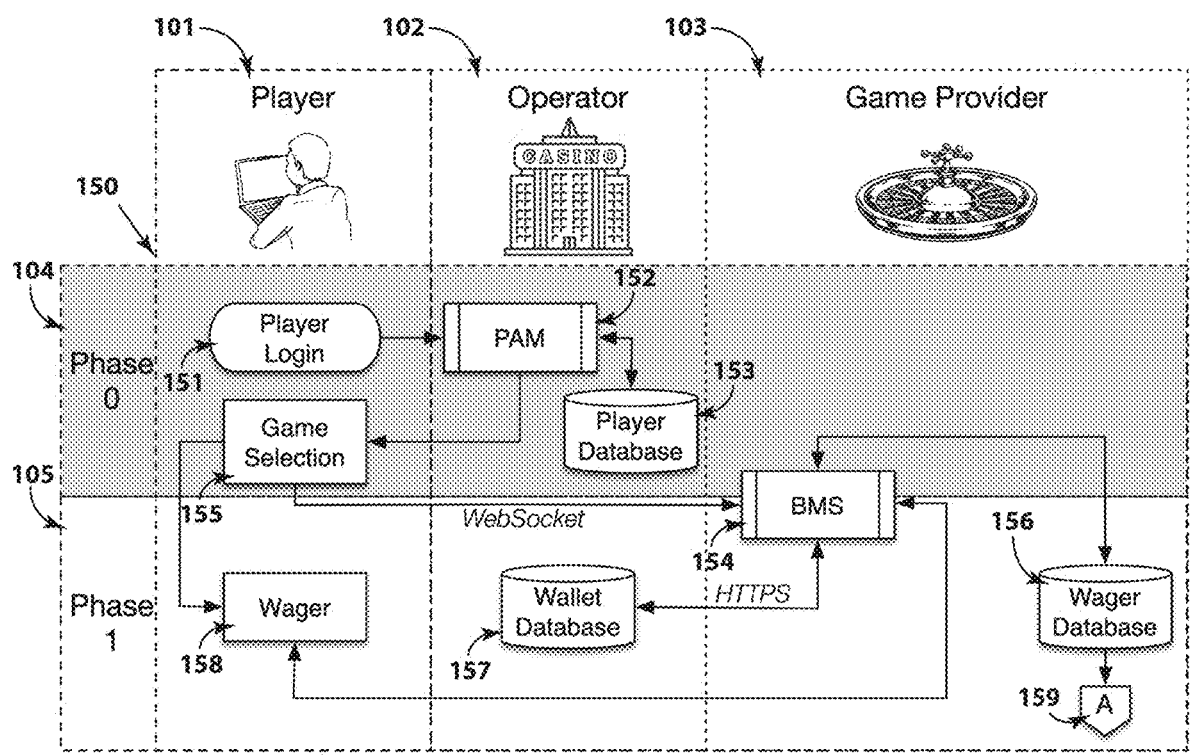
FIG. 1C is a matrix block diagram representative example providing a schematic graphical overview highlighting phases zero and one of wagering compatible with FIGS. 1A and 1B.
Figure 1D:
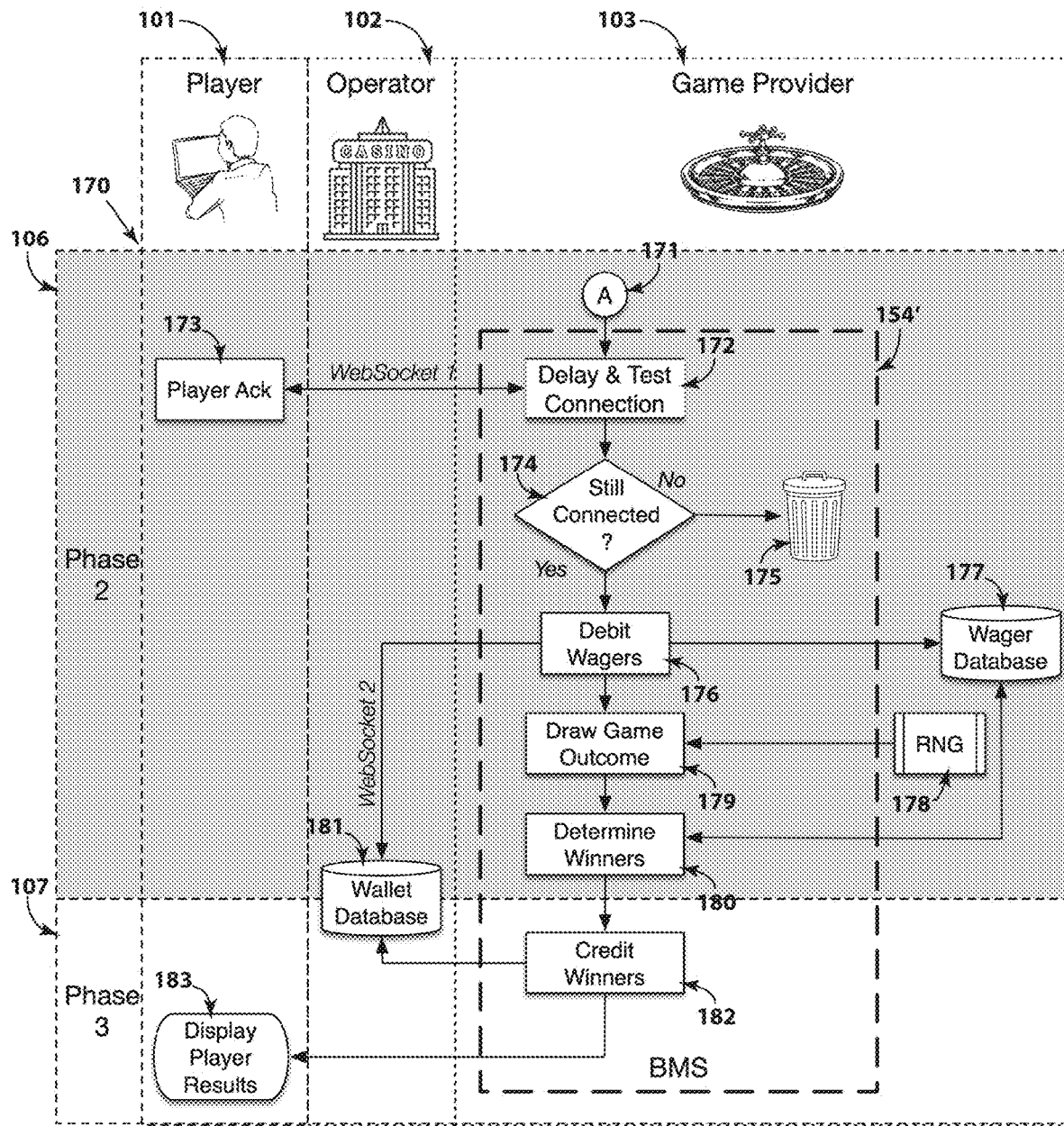
FIG. 1D is a matrix block diagram representative example providing a schematic graphical overview highlighting phases two and three of wagering and the entities interacting with each phase that is compatible with FIGS. 1A thru 1C.

FIGS. 1A through 1D, taken together, provide detailed specific embodiments of the disclosed casino game stream system. FIG. 1A is an overall representative example 100 block diagram of a casino game stream system illustrating the high-level functionality of both its video generation and wager processing subsystems. FIG. 1B is an exemplary block diagram 115 of the casino game stream system's video generation subsystem. And, FIGS. 1C and 1D provide illustrative block diagrams of the casino game stream system's wager processing subsystem.

As shown in FIGS. 1A through 1D, the disclosed casino game stream system is illustrated as a conceptual matrix. The three columns (101 through 103) in the matrix denote the three entities interacting with the system (i.e., the player 101, the Operator 102, and the Game Provider 103) with the four rows in the matrix denoting the four phases (i.e., phase zero 104 through phase three 107) processed by the system for each game. If a particular block diagram function appears entirely within a matrix cell, its functionality is limited to that cell entity and phase—e.g., in FIG. 1B the Game Selection 118 function is exclusive to the Player 101 during phase zero 104. If a particular block diagram function straddles cells, its functionality is shared between the two cells—e.g., in FIG. 1B the Bet Management System (BMS) 119 function is exclusive to the Game Provider 103 during phases zero 104 and one 105.

Of the four phases, phase zero 104 is optional since it is only needed when player 101 initially logs on for a session. There are typically three entities interacting with the casino game stream system. The player 101 entity refers to both the human player as well as the "player's device" that is used by the player to connect to the casino game stream system. The optional demarcation between Operator 102 and Game Provider 103 entities is included since the Game Provider 103 typically provides the actual draw game system and the appropriate video streams as a "white label" product to the Operator 102. The Operator 102 is the player-facing brand casino or online site (e.g., MGM, Caesars, Paddy Power) that is typically licensed in a given jurisdiction to accept wagers and establish digital wallets to hold the player's funds. Thus, two entities typically provide casino game stream services to the player 101 primarily due to licensing, brand recognition, and liability limitations. Of course, under some circumstances, it may be desirable for one, three, or more entities to offer casino game stream services; those arrangements would still be compatible with this disclosure.

Starting with the FIG. 1A overall representative example 100 block diagram, during phase zero 104 player 101 logs into the casino game stream system 108 automatically initiating first sector authentication within the Operator 102 subsystem. Once first sector authentication is successfully completed, player 101 is presented with a welcome screen typically showing a virtual lobby where any of a plurality of games can be selected by the player 101 (e.g., FIG. 2A). When player 101 (FIG. 1A) selects a particular game, a second sector authentication is automatically initiated by the Game Provider 103 subsystem. Immediately upon completing the second sector authentication process, the casino game stream system will proceed to phase one.

During the phase one 105 preamble 109, a pseudorandom series of video fragments are assembled into a scene offering various takes of a croupier waiting to spin a money, dice, or roulette wheel. This seamlessly assembled preamble scene is streamed to the players 101 throughout the phase one 105 wagering period. If the player 101 selected a game that is in progress, the player 101 will not be able to make a wager until the previous game is completed and a new game begins. During this waiting period, the player's 101 video stream will typically display the game in progress with a video overlay instructing the player 101 to please wait for the next game (e.g., FIG. 2B). This waiting period is necessary since players wager on the same game—i.e., the same game is typically broadcast to a plurality of players 101 (FIG. 1A). When a new game begins, during this phase one wagering period, a player 101 can make a wager on the pending drawing (e.g., FIG. 2C).

At phase two 106 (FIG. 1A), the "No More Bets" period 110 begins. As its name implies, the casino game stream system shuts down all wagering for the pending drawing at the start of this period, streaming messaging that the time for wagering for the pending drawing has ended (e.g., FIG. 2D). While the "No More Bets" messaging is streaming, after a predefined short delay (e.g., two seconds), the Bet Management System (BMS) performs a connection check for all players 101 (FIG. 1A) who have pending active wagers. If a player 101 remains connected, the BMS will debit the wagered funds from the player's 101 wallet and log the wager for the pending drawing. Conversely, if a player 101 is disconnected from the casino game stream system when the BMS is performing the connection check the pending wager is essentially voided. Also, during this time period, Game Provider 103 executes a call to a RNG to determine the winning results for the pending drawing. Once the RNG drawing results are completed, a pseudorandom series of video fragments are assembled into a scene that shows the winning drawing results.

Figure 2A:
FIG. 2A is a representative example isometric view of a phase zero video stream in accordance with preferred embodiments of the present invention.
Figure 2B:
FIG. 2B is a representative example isometric view of a first portion of a phase one video stream in accordance with preferred embodiments of the present invention.
Figure 2C:
FIG. 2C is a representative example isometric view of a first portion of a phase one video stream in accordance with preferred embodiments of the present invention.
Figure 2D:
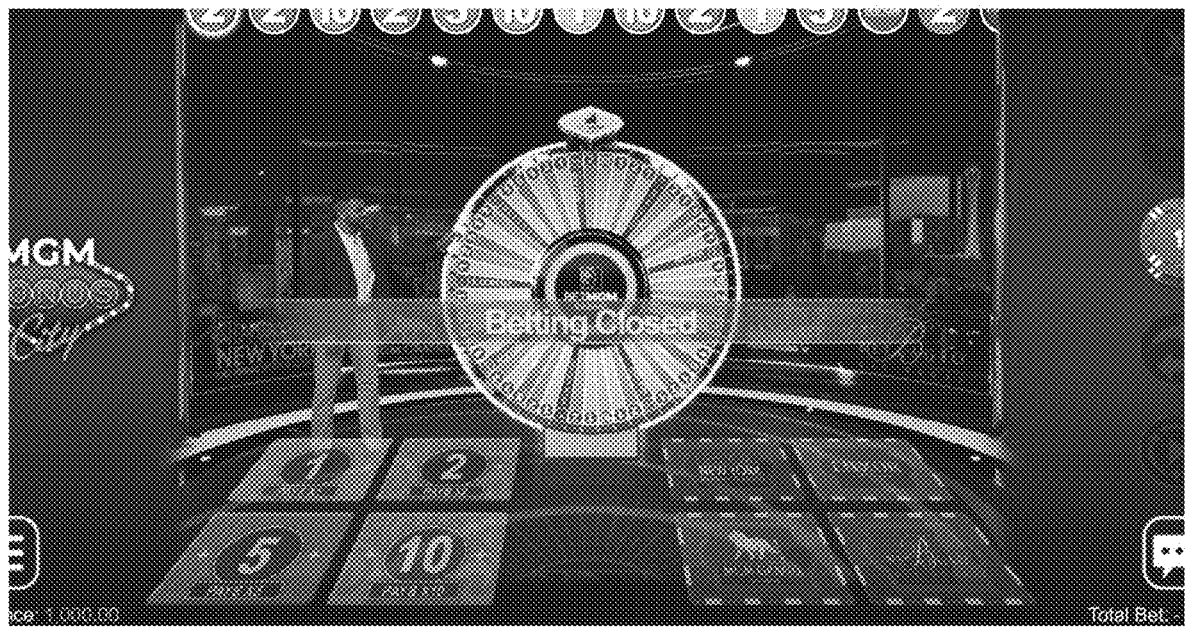
FIG. 2D is a representative example isometric view of a portion of a phase two video stream in accordance with preferred embodiments of the present invention.
Figure 2E:
FIG. 2E is a representative example isometric view of a first portion of a phase three video stream in accordance with preferred embodiments of the present invention.
Figure 2F:
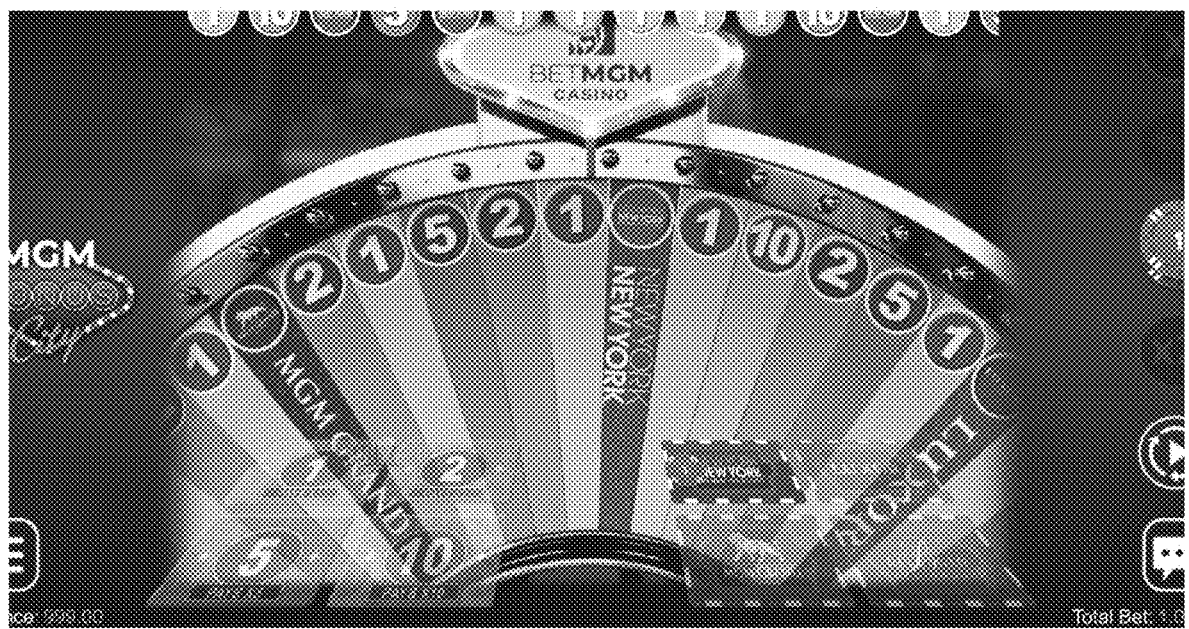
FIG. 2F is a representative example isometric view of a second portion of a phase three video stream in accordance with preferred embodiments of the present invention.

At this point, the casino game stream system enters the final phase (phase three 107) for the game, showing the drawing results 111 (FIGS. 2E and 2F). During this period, any player 101 (FIG. 1A) with a winning wager will have their winnings automatically deposited in their wallet. Finally, the winning draw results scene is streamed to all active players 101 with winning players 101 receiving winning notifications.

Therefore, the casino game stream system 100 can operate in four modal phases (104 through 107) across three different entities (101 through 103). By providing different functionalities with each phase, the system ensures security by not determining the pending drawing result until the "No More Bets" (phase two 106) begins. Additionally, by verifying each player's 101 connection status before honoring their wager and debiting their wallet, the system 100 also ensures wager integrity.

FIG. 1B provides an exemplary matrix block diagram 115 overview of a general embodiment of a casino game stream system's video streaming subsystem. Phase zero 104 starts with a player 101 logging into the casino game stream system 116. Once the player 101 completes the login process, she will be presented with a Welcome Screen 117, which is typically illustrated as a virtual lobby where the player 101 can select 118 any one of a plurality of games on offer. As shown in matrix block diagram 115, the initial player login and welcome screen are controlled by the Operator 102.

When the player selects a game, the Bet Management System (BMS) 119 conducts a second sector authentication process and, upon completion of that process, coordinates with the Video Controller/Scheduler 120 to determine if the player's 101 selected game is ongoing, if so the player 101 will be presented with a "Please Wait" video stream (e.g., FIG. 2B) transmitted to the player's (FIG. 1B) device 121. After completion of the previous game or if no game was currently in process, the player 101 will be presented with a Preamble Video Stream 125 transmitted to the player's 101 device 121. The Preamble Video Stream 125 is a pseudo-random arrangement of video fragments organized into a series of takes comprising a scene featuring the same croupier that will be shown conducting the drawing in the future.

The Preamble Video Stream 125 video fragments are pseudorandomly arranged with input from a Random Number Generator (RNG) 124. The RNG 124 passes at least one seed number to the Video Controller/Scheduler 120, which arranges the video fragments from the Video Store Database 123 into the Preamble Video Stream 125. The Video Controller/Scheduler 120 ensures the Preamble Video Stream 125 is arranged within the ruleset for the given croupier grouping.

The video fragments saved in the Video Store Database 123 are arranged by the three game phases (105 thru 107) such that pseudorandomly selecting video fragments from a given phase storage will result in a coherent and chronologically correct appearing scene for that phase. There are typically a plurality of takes representing the same video fragment allowing for pseudorandom selection of video fragments for a scene, thereby ensuring variance.

Optionally and preferably, the assembled video stream is embodied as a dynamic m3u8 (Moving picture experts group layer 3 Unicode 8 characters) file. The m3u8 file format has the advantage of being a single-entry playlist file pointing to a stream in each player's channel. This allows the casino game stream system to present the Preamble Video Stream 125 and the No More Bets Video Stream 127 to the player 101 before the winning draw has been determined.

During phase one 105 the player 101 has the option to make a Wager 122. If the player 101 makes a Wager 122, the wager is transmitted to the BMS 119 which records it in a pending status in the Wager Database (see FIG. 1C, callout 156). Optionally and preferably, the BMS 119 (FIG. 1B) will also instruct the Video Controller/Scheduler 120 to insert a wager-accepted message or image into the player's 101 Preamble Video Stream 125. Again, the dynamic capabilities of the preferred m3u8 file format allow for player 101 specific video streams that can be modified after an action by a player 101—e.g., placing a Wager 122.

Phase two 106 commences after a predetermined time period expires or some other event occurs (e.g., a minimum or maximum number of wagers has been submitted). At the start of phase two 106, the RNG 124 passes at least one seed number to the Video Controller/Scheduler 120, which arranges the video fragments from the Video Store Database 123 into the No More Bets Video Stream scene 126, which is transmitted to the player's device 127. The No More Bets Video Stream scene 126 is a pseudorandom arrangement of video fragments organized in a scene featuring the same croupier from the Preamble Video Stream scene 125. Also, during phase two 106, the actual drawing occurs with all pending wagers finalized.

Finally, phase three, 107, begins with the Video Controller/Scheduler 120 using the RNG 124 draw number (and possibly other RNG 124 numbers) to generate the Draw Results Video Stream scene 128, which graphically reveals the draw results to the player's device 129. The Draw Results Video Stream scene 128 will include the actual drawing results generated from the pseudorandom arrangement of video fragments organized into a drawing results scene featuring the same croupier as before. Once again, the dynamic capabilities of the preferred m3u8 file format allow for player 101 specific video streams that can individually reveal if a player 101 is a winner or not.

FIGS. 1C and 1D, taken together, provide an exemplary matrix block diagram overview of a general embodiment of a casino game stream system wager processing subsystem 150 and 170. FIG. 1C illustrates wager processing subsystem functionality for phases zero 104 and one 105. FIG. 1D illustrates wager processing subsystem functionality for phases two 106 and three 107.

FIG. 1C begins with the player 101 logging 151 into the Player Account Management (PAM) function 152, controlled by the Operator 102. When the login request 151 is received by the PAM 152, the PAM 152 typically queries its Player Database 153 to authenticate the player 101 to the first sector (Operator subsystem 102). This first sector authentication process typically involves the player 101 entering a player name and associated password. The entered player name and password are verified against a Player Database 153—the password is preferably stored in the Player Database 153 as a cryptographic hash, not in cleartext. Upon successful first sector authentication, the player is shown a welcome screen typically illustrated as a virtual lobby where any of a plurality of games can be selected by the player 101 utilizing the Game Selection function 155. When the player 101 selects a particular game, the Game Provider 103 subsystem automatically initiates a second sector authentication process.

The first sector authentication process can be thought of as the player's 101 device authenticating to the Operator 102 server. The second sector authentication is the Operator 102 server authenticating with the Game Provider 103 server to provide a player 101 unique, bidirectional communications channel that persists as long as the player's 101 login session persists. The purpose of the second sector authentication process is to allow the Game Provider 103 server to send and receive player 101 unique data such that multiple draw game sessions can be supported without the Game Provider 103 server necessarily gaining specific knowledge of the player's 101 identity or direct access to the player's 101 digital wallet. Thus, the first and second sector authentication processes essentially provide a conceptual firewall between the Operator 102 and Game Provider 103 servers, protecting the players' 101 data and funds as well as ensuring that the Operator 102 cannot impact pending drawing results nor gain draw results before the actual drawing is concluded.

Returning to FIG. 1C, when the second sector authentication process is initiated, the Operator 102 server generates a secure token embodying the player's 101 Identification Data (ID) and session (connection) ID. The Game Provider 103 Bet Management System (BMS) 154 receives the information in this secure token and then sends it back to the Operator 102 server Wallet Database 157 for account verification. The Wallet Database 157 responds with possibly a new token (player 101 ID and session ID for the wallet) or an acknowledgment over the original session ID with the BMS 154 recording one or both sets of player and session IDs in its Wager Database 156. These one or two player/session ID channels are then used by the Operator 102 and Game Provider 103 servers for all bidirectional communications (e.g., video streams, player 101 wagers, draw game results) as long as the player's 101 login session persists.

Optionally, the various player 101 session communications channels are encrypted, preferably using asymmetrical (public/private) encryption to encrypt a shared symmetrical encryption key (e.g., X.509 certificates and Transport Layer Security or "TLS"). Thereby further ensuring the transmitted data's confidentiality, security, and integrity. Optionally, a WebSocket protocol is established on top of the HTTP (Hyper Text Transfer Protocol) communications layer for player 101 session communications channels with each WebSocket linked directly to a player 101. Preferably, an HTTPS (Hyper Text Transfer Protocol Secure) communications layer could be established for player 101 session communications channels between BMS 154 and Wallet Database 157. Thus, the player and session IDs are linked to given WebSocket(s), allowing the BMS 154 to store WebSockets IDs in its Wager Database 156 to support sessions. This simplifies real-time communication by maintaining an active link between the Operator 102 and Game Provider 103 servers, allowing the Game Provider 103 to quickly send updates like game results, wager outcomes, or status changes while the Operator 102 can instantly report game actions or player interactions back to the platform—e.g., wagering.

After the dual sector authentication is completed for the player 101, the BMS 154 optionally initiates a second request to the Wallet Database 157 using the appropriate player 101 channel to retrieve the player's 101 wallet balance. Alternatively, the BMS 154 can query the Wallet Database 157 after a wager is made to determine if a player 101 has sufficient funds to cover the wager or if a player's desired wager is within her credit limit. The second option has the advantage of the Game Provider 103 subsystem never gaining knowledge of the player's 101 wallet balance with the disadvantage of a more complex wager protocol. Regardless of the BMS 154 query to the Wallet Database 157 protocol, when the player 101 makes a wager the Wager function 158 interacts with the BMS 154 to register the wager, logging the pending wager in the Wager Database 156.

At this point, phases zero and one are completed, and the casino game stream system progresses to phase two 159. Phases two and three are illustrated 170 in FIG. 1D. Phase two begins 171 with a "No More Bets" mode initiated, with the "No More Bets" notification streamed to the players 101. When the "No More Bets" video stream is broadcast to the players 101, the BMS 154' enters a short delay period 172 (e.g., two seconds) before looping through each player 101 logged into the casino game stream system to ensure each connected channel remains active. In one particular embodiment, the BMS 154' tests for an active connection by pinging each player's device 173 and waiting for an acknowledgment from each device. As the BMS 154' tests 174 each player 101 for an active connection, any player 101 link that has dropped will have any pending wager deleted 175. Thus, if a player 101 lost their connection at that point, their wager is not honored/placed. The BMS 154' will not transact with the wallet; the wager is essentially voided. By not immediately debiting a player's wallet when a wager is made by the player, the BMS 154' effectively allows a player to change or withdraw their wager on the upcoming draw game so long as preamble phase one persists.

Conversely, if a player 101 is still connected, the BMS 154' transacts with the Wallet Database 181, making the wagering request to debit the player's 101 balance based on the wager placed 176. The completed wager is then logged into the Wager Database 177.

Once all pending wagers are verified and consummated, the BMS 154' initiates a call to a RNG 178 to determine the outcome of the pending drawing 179. The RNG 178 selects the winning draw 179 with the same RNG 178 draw results arranging the pseudorandom selection of the appropriate video fragments into the drawing results scene. After the drawing results are known 179, the Wager Database 177 is queried 180 such that all placed wagers are set to winning or losing status. Since the BMS 154' does not make the call to the RNG 178 to determine the pending draw winner 179 until the casino game stream system enters phase two 106 (i.e., "No More Bets"), the potential for illicit wagering (where the outcome is known before the results are publicly announced) is significantly reduced if not eliminated.

After all the winning wagers are determined the casino game stream system enters phase three 107. In this phase the winning player's 101 wallets are credited 182 with the appropriate funds in the Wallet Database 181. At the same time, the draw game results are streamed to each player 101 still connected to the system, with winning players 101 preferably receiving special notifications 183.

In a scenario where a player's 101 wager was successfully placed in the BMS 154' with the player's 101 wallet debited 181 and the consummated wager logged into the Wager Database 177, but the player 101 is disconnected before the results are announced, their wager will not be impacted. If a player 101 wins their wager, the BMS 154' will continue to operate and settle the wager on the player's 101 behalf with any winnings automatically credited to the player's 101 wallet in the background.

FIGS. 2A thru 2F, taken together, illustrate examples of one general embodiment of this invention providing a casino game stream system. FIGS. 2A thru 2F are arranged in chronological order starting with the welcome screen, progressing through wagering and "No More Bets," and culminating with the draw game results.

Starting with FIG. 2A, this initial welcome screen (phase zero) is an illustrative example of what would be streamed to the player after logging in. After the player selects a game to play, the casino game stream system will progress to phase one.

If the player's selected game is in progress, the player will not be able to wager on the current game with the player's video stream displaying some type of "Please Wait" message, as shown in FIG. 2B. Typically, this "Please Wait" message will be embodied as an overlay with the current game displayed in the background of the video stream. Allowing the player to see the current game without the ability to wager on the game has the advantages of both reducing potential boredom during the waiting period as well as subtly informing players that they are participating in a large draw game with other people wagering on the same game results. Once the extant game concludes and a new game commences, the player will now be able to wager on the new and subsequent games. During this phase one wagering period, the player can typically make wagers by clicking on different portions of the video stream, as shown in FIG. 2C.

Moving onto the phase two "No More Bets" period, the player is notified that the "No More Bets" period has commenced typically with an overlay over the video stream, as shown in FIG. 2D. Finally, phase three reveals the draw game results in the video stream with winning players typically receiving notification during this period. Examples of phase three draw game result video streams are shown in FIGS. 2E and 2F.

Thus, the disclosed casino game stream system provides video streams of human croupiers conducting draw games seemingly in real time. By progressing chronologically through the various phases of each draw game, a natural rhythm develops. Additionally, the disclosed casino game stream system features a scheduler function that ensures subsequent games include a "memory horizon" of previous games such that each new game essentially picks up where the other game left off. For example, if a spinning money wheel is used in a draw game, the starting position for a new game wheel spin will be where the previous game ended.

Figure 3A:
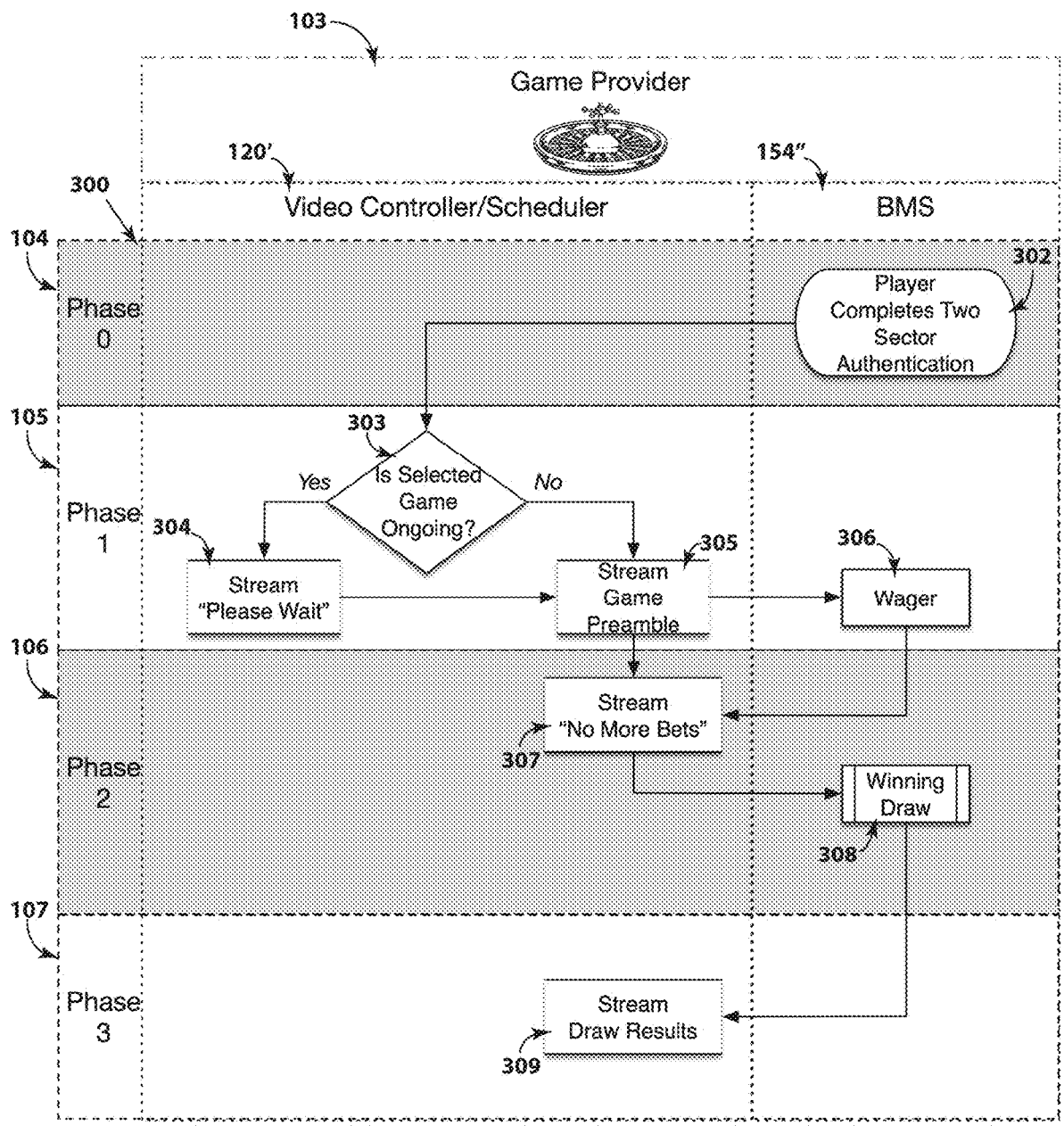
FIG. 3A is a matrix block diagram representative example of the Video Controller/Scheduler coordinated with the Bet Management System (BMS) compatible with FIGS. 1A thru 1D.

With this disclosure the Game Provider 103 controls the combining of the video streams with the live wagering. FIG. 3A illustrates an exemplary matrix block diagram overview 300 of how the Video Controller/Scheduler 120' interacts with the BMS 154" within the Game Provider system 103. The two columns (120' and 254") in the matrix represent the Video Controller/Scheduler 120' and the BMS 154". The four rows in the matrix denote the four phases. As before, if a particular block diagram function appears entirely within a matrix cell, its functionality is limited to that cell entity and phase—e.g., the Stream Game Preamble function 305 is exclusive to the Video Controller/Scheduler 120' during phase one 105.

FIG. 3A starts immediately after the player has been authenticated by the two sectors 302 in phase zero 104. After authentication, the Video Controller/Scheduler 120' progresses to phase one and checks to determine if the game selected by the player is presently ongoing 303. If so, the Video Controller/Scheduler 120' constructs a "Please Wait" video stream and transmits it to the player's device 304. If not or when the ongoing game is concluded, the Video Controller/Scheduler 120' constructs a preamble stream 305 where the player can wager 306 on the upcoming draw. After the time period for wagering expires and the system progresses to phase two 106, the Video Controller/Scheduler 120' constructs the "No More Bets" video stream and transmits that stream to the player 307. At this point, the BMS 154" determines the Winning Draw 308 and transmits the results to the Video Controller/Scheduler 120'. The Video Controller/Scheduler 120' accepts the draw results data and constructs the phase three 107 Draw Results 309 video stream.

Figure 3B:
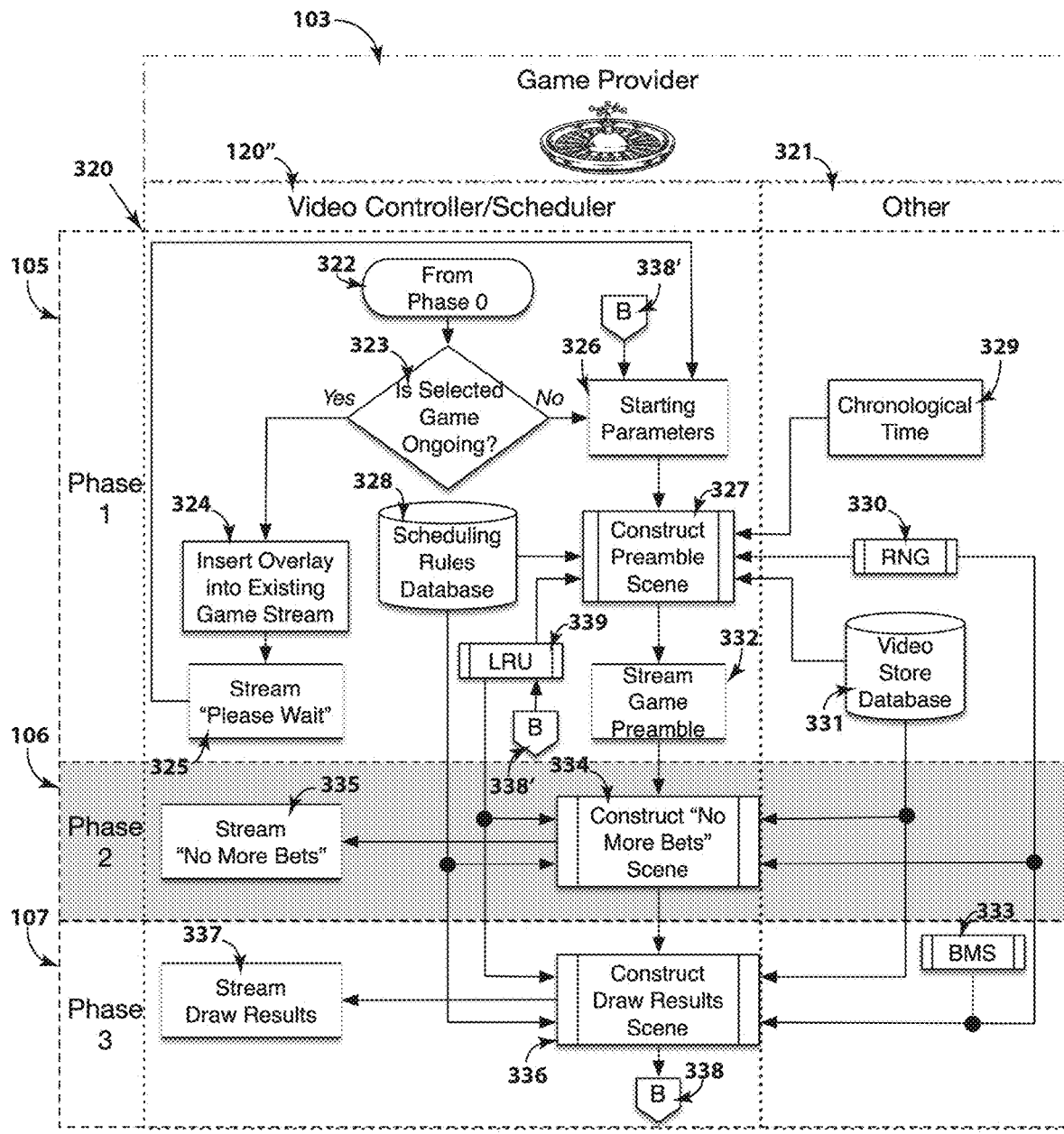
FIG. 3B is a matrix block diagram representative example of the Video Controller/Scheduler coordinated with other portions of the Game Provider system compatible with FIGS. 1A thru 1D and 3A.

FIG. 3B illustrates a detailed exemplary matrix block diagram 320 of the Video Controller/Scheduler 120" interacting with the Game Provider system 103. The matrix's two columns (120" and 321) represent the Video Controller/Scheduler 120" and the rest of the Game Provider system 321. The three rows in the matrix denote phases one through three-phase zero was omitted since the Video Controller/Scheduler 120" is not utilized in phase zero. As before, if a particular block diagram function appears entirely within a matrix cell, its functionality is limited to that cell entity and phase.

The detailed exemplary matrix block diagram 320 of the Video Controller/Scheduler 120" begins when the casino game stream system exits phase zero 322 after the player is fully authenticated to the system and begins phase one 105. Initially, the system determines if the game the player selected is in progress or starting anew 323. If the game is in progress, the Video Controller/Scheduler 120" generates a "Please Wait" overlay 324 and inserts it on top of the current game, thus streaming the current game with the "Please Wait" overlay (e.g., FIG. 2B) to the player's device 325 (FIG. 3B). During this "Please Wait" period the player's wagering buttons for the current game will be disabled such that the player will be unable to make a wager.

After the previous game concludes or if the game the player selected was not ongoing 323, the Video Controller/Scheduler 120" will begin constructing the preamble scene to be streamed for the next game 327. This process is initiated by the Video Controller/Scheduler 120" referencing the Starting Parameters 326, Scheduling Rules Database 328, and the Least Recently Used (LRU) algorithm 339 for the upcoming game. The Starting Parameters 326, Scheduling Rules Database, and LRU algorithm 339 partially cull the set of video fragments available to the Video Controller/Scheduler 120" to provide a more realistic and logically coherent (i.e., reasonable scene structure given the structure of the previous game) preamble scene.

For example, the croupier selected for a given game can be a function of a virtual "shift" where each croupier may appear in a series of game drawings and then be replaced by another croupier after their series "shift" ends. With this example, the croupier's virtual "shift" may be based on Chronological Time 329, where no croupier can appear in video feeds for longer than forty consecutive minutes or may be a function of a fixed number of draw games (e.g., seven). Thus, in these examples, the pool of available croupier video fragments would potentially be restricted to the constructer or controller 327 to accommodate the virtual "shift" concept. In another example, the same croupier cannot simultaneously appear in two games. In another example, the scene may include a window appearing to show the outside world where the outside world's appearance would change to reflect the real world Chronological Time 329. In all of these examples, Chronological Time 329 can be employed to create a more realistic and logically coherent scene appearance.

Preferably, the Starting Parameters 326 should also allow the acceptance of a feedback loop from the previous game (338 and 338'). This feedback loop (338 and 338') effectively extends the Video Controller/Scheduler 120" "memory horizon" to previous games such that each new game essentially picks up where the other game left off. For example, if a draw game features a spinning wheel, the starting position for a new game wheel spin will appear where the previous game wheel spin ended. Since the outcomes of previous draw games were determined by a RNG and not preordained, this game-to-game "memory horizon" requires the feedback loop from the previous game (338 and 338') to inform the Starting Parameters 326 of the correct configurations and, consequently, the correct video fragments to select for the start of the next scene by culling the video fragments showing non-correct starting configurations.

Optionally and preferably, the Least Recently Used (LRU) algorithm 339 also has a "memory horizon" of previous games with a feedback loop (338 and 338') informing it of the exact video fragments that were used in the previous game(s). This enables the LRU 339 to prevent the repetition of video scenes players have already seen or similarly appearing scenes. Thus, the optional LRU algorithm 339 enhances the player experience by ensuring more diverse and engaging content from game to game.

Notice that the "memory horizon" enables the Starting Parameters 326 to primarily select video fragments from the previous game or scene (e.g., the starting position of a wheel for the upcoming draw game must be identical to the previous game wheel ending position) while the LRU 339 eliminates video fragments from the previous game or scene. Therefore, it is possible that the specified video fragments for the Starting Parameters 326 and LRU 339 functions will conflict. For example, assume the ending position for a previous game/scene culminated with a wheel position of the number "13;" then the Starting Parameters 326 would specify video fragments with a starting wheel position of "13" while the LRU 339 would cull video fragments with a starting wheel position of "13." Thus, each scene constructor (327, 334, and 336) will preferably include rulesets to establish a hierarchy of which video fragments should be culled in the case of conflict for a pending scene to remain logically coherent—e.g., in the previous example, the Starting Parameters 326 selection of the video fragments associated with wheel starting position "13" would overrule the LRU 339 attempt to cull the same video fragments.

Once the Starting Parameters 326, Scheduling Rules Database 328, and LRU algorithm 339 restrictions for the upcoming game are established, the Video Controller/Scheduler 120" constructs the preamble scene 327 (e.g., FIG. 2C) for the upcoming game using the set of video fragments still available from the Video Store Database 331 (FIG. 3B) with variance in the scene ensured by the RNG 330. The RNG 330 provides scene variance by pseudo-randomly selecting a series of video fragments in chronological order from the pool of video fragments available in the Video Store Database 331 after the Starting Parameters 326, Scheduling Rules Database 328, and LRU algorithm 339 restrictions were applied. When construction 327 of the scene is completed, the resulting preamble scene is streamed to the active players' devices 332. Optionally, the preamble scene can be embodied as a dynamic m3u8 single-entry playlist file, which allows the video stream of the scene to begin before the end of the scene is constructed. This option has the advantage of variable-length scenes.

When the phase one 105 stream is completed, the casino game stream system enters phase two 106 by constructing the "No More Bets" scene 334 (e.g., FIG. 2D) with the phase one ending state, Scheduling Rules Database 328 (FIG. 3B), and/or LRU algorithm 339 optionally restricting the pool of video fragments available from the Video Store Database 331 to an approved set for phase two. Again, the RNG 330 ensures variance for the "No More Bets" scene by pseudo-randomly selecting video fragments available from the restricted set of video fragments in the Video Store Database 331. When construction of the "No More Bets" scene is completed 334, the resulting scene is streamed to the active players' devices 335.

Finally, when the phase two 106 stream is completed, the casino game stream system enters phase three 107 by constructing the scene revealing the draw game results or draw game outcome third phase scene 336 (e.g., FIGS. 2E and 2F) with the phase two ending state and/or the Scheduling Rules Database 328 (FIG. 3B) optionally restricting the pool of video fragments available from the Video Store Database 331. However, when constructing the drawn game results, the Video Controller/Scheduler 120" must first communicate with the BMS 333 to ascertain the winning draw game outcome or draw results. When the winning results are known, the set of available video fragments is again restricted, with the RNG 330 providing variance by pseudorandomly selecting video fragments available from the set of video fragments from the Video Store Database 331. When construction of the winning outcome or draw results scene is completed 336, the resulting scene is streamed to the active players' devices 337 with the concluding parameters relayed 338 to the Starting Parameters function 326 for the next game.

Figure 3C:
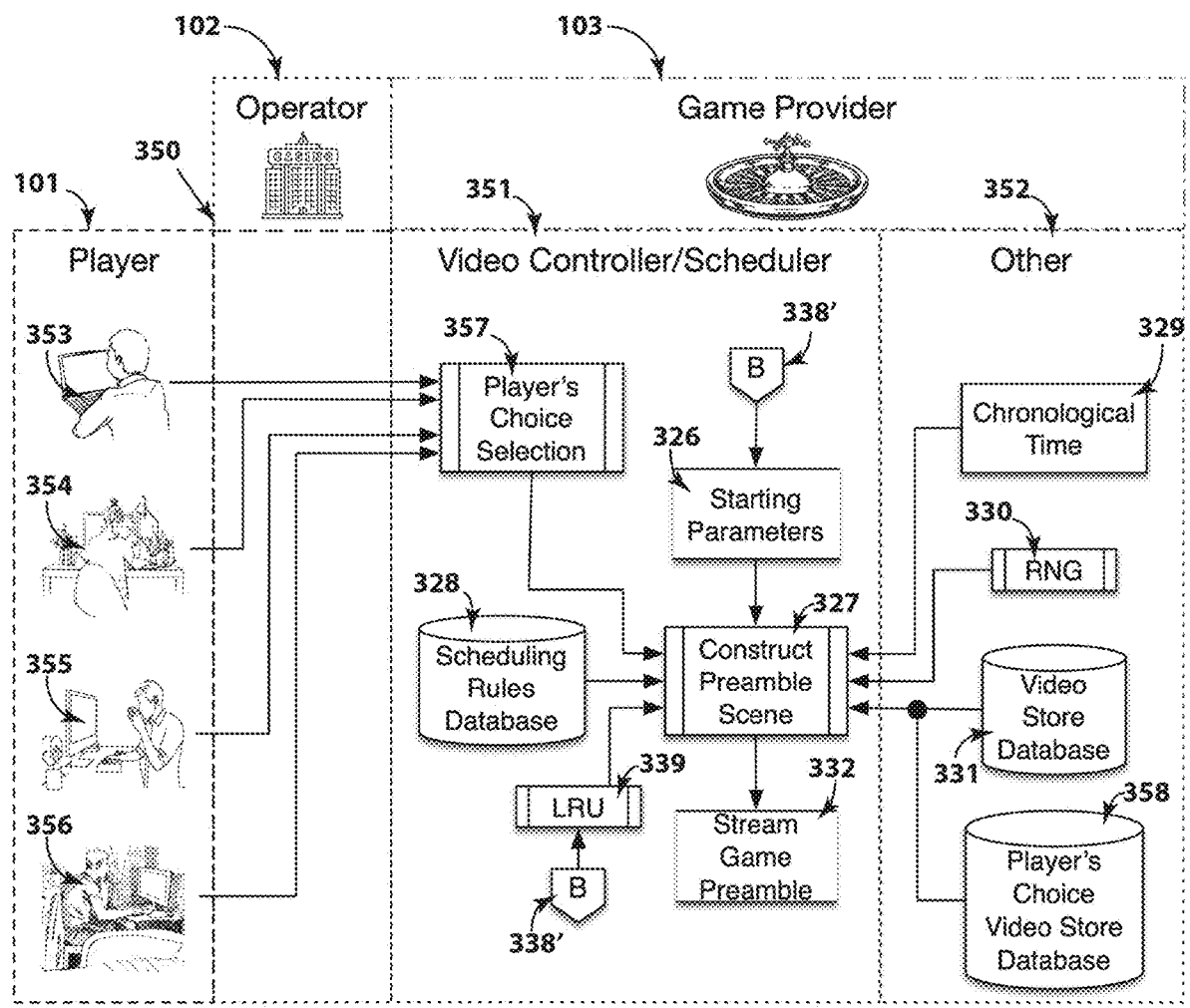
FIG. 3C is a swim lane block diagram representative example of the Video Controller/Scheduler modifying the video scenes based on player input compatible with FIGS. 1A thru 1D, 3A, and 3B.

FIG. 3C illustrates an exemplary swim lane block diagram 350 of the Video Controller/Scheduler 351 implemented with an optional player feedback loop that allows the players 101 to control visual portions of the preamble, "No More Bets," and/or draw results scenes. The swim lanes columns (101 thru 103) represent the player 101, Operator 102, and Game Provider 103. No phase division rows are illustrated in FIG. 3C since the player feedback loop option can be implemented in phases one, two, or three or all of the phases one through three. Similar to before, if a particular block diagram function appears entirely within a swim lane, its functionality is limited to that swim lane. The optional player feedback loop disclosure is limited to the phase one preamble scene for simplicity of discussion, but it should be understood that it could also apply to phases two, three, or all three phases.

When the Video Controller/Scheduler 351 begins constructing the preamble scene to be streamed for the next game the Starting Parameters 326, Scheduling Rules Database 328, and the LRU algorithm 339 for the upcoming game are typically utilized to restrict the pool of video fragments in the Video Store Database 331. With the addition of the optional player feedback loop functionality 357, the pool of potential video fragments may be expanded to include additional video fragments (e.g., Player's Choice Video Store Database 358) that can be effectively selected by the players impacting the appearance of a video scene 327 but not impacting the draw game's outcome. Alternatively, the additional video fragments under the control of the optional player feedback loop can be added to the Video Store Database 331, eliminating the construction of the Player's Choice Video Store Database 358 at the possible cost of greater complexity in the constructor 327 logic.

For example, in one embodiment, each individual player (353 thru 356) can select which croupier spins a virtual wheel for the upcoming draw. In this example embodiment, additional video fragments can be made available from the Player's Choice Video Store Database 358 (e.g., video takes where the pool of available croupiers are all seated on a couch with the chosen croupier standing up and leaving the couch area when the time has come to finalize the drawing) that supplement the standard video fragments in the Video Store Database 331 to provide the extra video takes needed to accommodate the player feedback loop. As before, the optional additional player feedback loop video fragment selection would utilize the RNG 330 to ensure variance when constructing player feedback loop scenes 327. The additional player feedback loop video fragments added to the preamble scene would not impact the drawing results but would allow players 101 to possibly feel some control over the game's outcome (e.g., a player 101 selects their "lucky" croupier). Notice that in this example embodiment, the different individual players (353 thru 356) can experience different appearing video streams 332 (e.g., different croupiers) while sharing the same drawing result.

In another example, all of the players (353 thru 356) connected for a particular game can vote on specific player feedback loop options. The option receiving the most votes becomes the video stream 332 that all players will see. This example embodiment differs from the previous exemplary embodiment in that all of the players 101 will see the same player feedback loop variable video stream 332, whereas, with the previous embodiment, each player would have viewed their own customized video stream.

This first exemplary embodiment has the advantage of customizable video streams to each player's desire with the disadvantages of higher technical complexity and possibly a greater sense of isolation for the player. The second exemplary embodiment is inherently technically simpler and has the potential advantage of customizable video streams determined by popular vote where the players can feel they are participating in a group.

Optionally, the second exemplary embodiment can include a group chat capability via a chat platform where each player (353 thru 356) can type comments that the other players (353 thru 356) will see—e.g., discuss which croupier or wheel is "lucky." This chat option would possibly demonstrate to each player that he or she is participating in a "live" event, generating a feeling of comradery. Additionally, the chat option may also have the benefit of extending the phase one preamble time period in a natural manner since the players would be reading and responding to chats rather than simply waiting for a drawing to occur. The extended phase one preamble time period also potentially increases the opportunity for extended wagering.

Since the optional player feedback loop feature creates dynamic selections of video fragments based on human players' choices, it is possible that the resulting player feedback loop video scenes/streams will vary in duration depending on players' selections. By embodying player feedback loop video streams as a dynamic m3u8 single-entry playlist file, the duration of the player feedback loop video scenes/streams can vary even after a stream has started, allowing for player-induced delays.

Figure 4A:
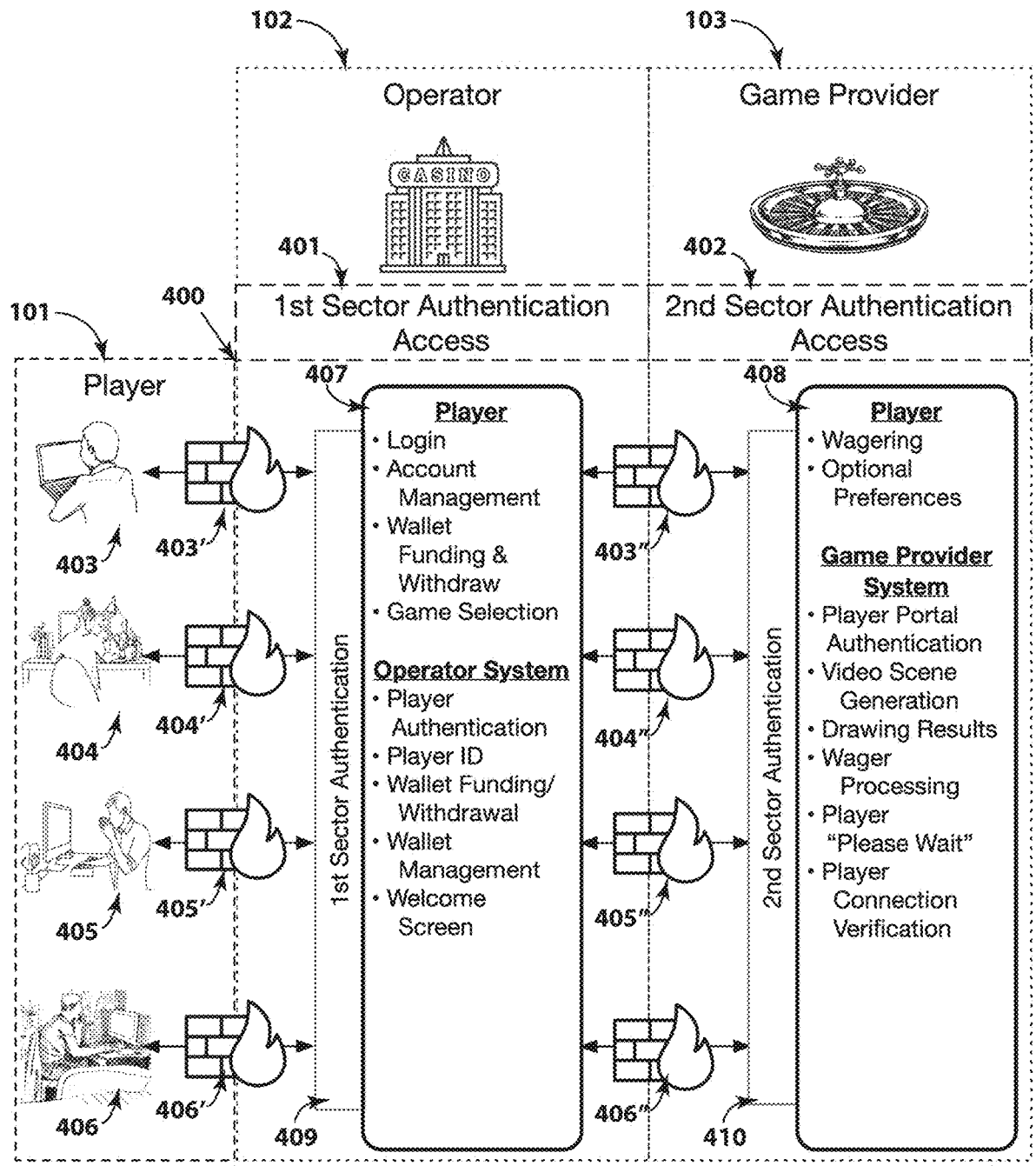
FIG. 4A is a preferred embodiment swim lane block diagram representative example of two sector authentication compatible with FIGS. 1A thru 1D and 3A thru 3C.
Figure 4B:
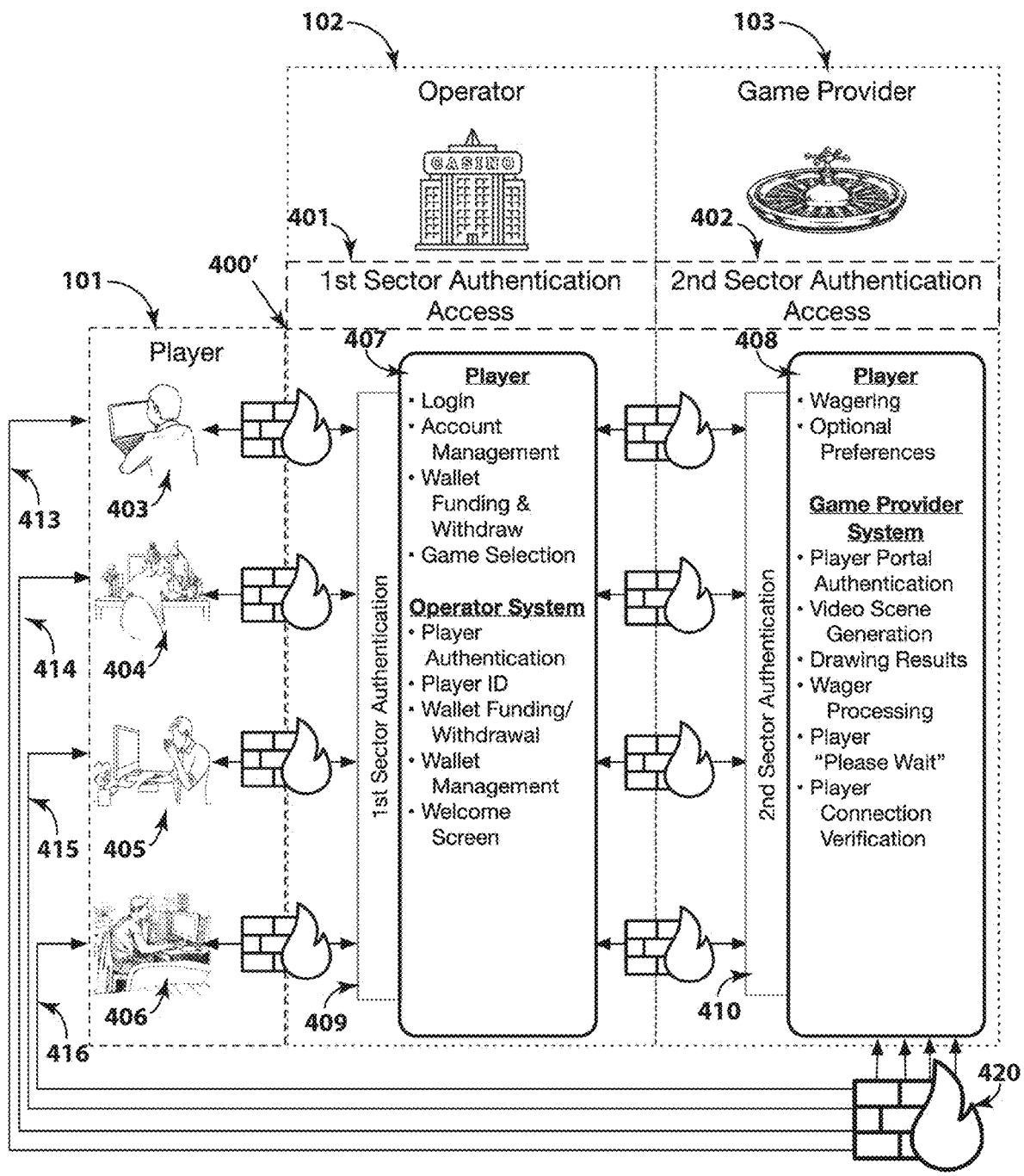
FIG. 4B is an alternative embodiment of the swim lane block diagram representative example of two sector authentication compatible with FIGS. 1A thru 1D and 3A thru 3C.

FIGS. 4A and 4B, taken together, show different embodiments of this disclosure, providing two exemplary illustrations of dual sector authentication. FIG. 4A illustrates an exemplary swim lane block diagram 400 highlighting the primary embodiment of the casino game stream system's unique dual sector player authentication. FIG. 4B illustrates an alternative exemplary swim lane block diagram 400' embodiment of the casino game stream system dual sector player authentication. The swim lanes columns (101 thru 103) represent the player 101, Operator 102, and Game Provider 103. No phase division rows are illustrated in FIGS. 4A and 4B since the dual sector player authentication process is initiated and completed in phase zero. Similar to before, if a particular block diagram function appears entirely within a swim lane, its functionality is limited to that swim lane. If a block diagram function straddles a swim lane (e.g., firewall 403' of FIG. 4A) its functionality is shared between the two swim lanes.

Generally, the first 401 and second 402 dual sector player authentication functionality enables the isolation or "siloing" of information in one portion of the casino game stream system from the other. Specifically, this isolation or "siloing" limits potential liabilities and legal requirements for the Operator 102 and Game Provider 103 while at the same time enhancing security for the overall casino game stream system.

The Operator 102 portion performs first sector authentication 409 with the players 101, allowing each player (403 thru 406) access to the casino game stream system. The information 407 required for first sector authentication 401 includes player login credentials, player identification (ID), player wallet funding/withdrawal, and player wallet account management—e.g., Office of Foreign Assets Control (OFAC), Know Your Customer (KYC), etc. This first sector authentication 409 allows the player 101 to log in, manage accounts, and select a draw game for a potential wager. With first sector authentication 401, all player identifiable information and associated legal requirements are confined to Operator 102, isolating Game Provider 103 from this information and consequently reducing the potential liability and legal regulations of Game Provider 103.

Second sector authentication 402 allows the Game Provider 103 to connect with the Operator 102 to enable the players 101 to view the streamed video scenes, wager on a pending drawing, and collect any winnings from a successful drawing wager. The second sector authentication process 410 transparently interfaces each player 101 with the Game Provider 103 via the Operator 102 system without revealing any personal information about the player 101—i.e., any personal player information is effectively redacted from the Game Provider 103. Personal information is also interchangeably referred to herein as Personally Identifiable Information (PII).

When the second sector authentication process is initiated, the Operator 102 server generates a secure token embodying the players' 101 Identification Data (ID) and session (connection) ID. The Game Provider 103 receives the information in this secure token and then sends it back to the Operator 102 server for account verification. The Operator 102 server responds with possibly a new token (player 101 ID and session ID for the wallet) or an acknowledgment over the original session ID. These one or two player/session ID channels are then used by the Operator 102 and Game Provider 103 servers for all bidirectional communications (e.g., video streams, player 101 wagers, draw game results) as long as the player's 101 login session persists. Thus, each player (403 thru 406) can view their respective video streams and make wagers without the Game Provider 103 knowing anything about the specific player's identity or bank accounts.

By establishing player (403 thru 406) unique channels where specific information about each player is unknown to the Game Provider 103, the casino game stream system 400 isolates or siloes the information and associated functionality of the Operator 102 and Game Provider 103 portions. Thus, the Operator 102 responsibilities are limited to player authentication, player management, and player wallet management 407 with the Game Provider 102 responsibilities limited to video scene/stream creation, wager management, and drawing results 408. This underlying architecture greatly enhances the security of the casino game stream system 400, effectively creating separate sandboxes or silos for the Operator 102 and the Game Provider 103. With the preferred embodiment 400 of FIG. 4A, this isolation is further enhanced by providing optional firewalls (403" thru 406") between the Operator 102 and Game Provider 103 as well as firewalls (403' thru 406') between the Operator 102 system and the players 101. The preferred embodiment 400 of FIG. 4A illustrates the player (403 thru 406) unique channels passed through the Operator's 102 portion of the casino game stream system connecting to the Game Provider portion 103 without any processing or monitoring by the Operator's 102 portion.

As illustrated in FIG. 4B, an alternative embodiment 400' shows each player (403 thru 406) directly connecting (413 thru 416) to the Game Provider 103 through a firewall 420 without any Operator 102 passthrough. With this embodiment, the original session ID received by the Game Provider 103 from the Operator 102, also contains Universal Resource Locator (URL) credentials that allow each player's (403 thru 406) device to hyperlink and connect directly to the Game Provider 103 with the Game Provider 103 establishing an Internet URL socket compliant with the URL credentials contained in the secure token ID. Thus, with this alternative embodiment 400', a direct link between the player's (403 thru 406) device and the Game Provider 103 can be established with each player's (403 thru 406) device URL credentials functioning as the direct player (403 thru 406) authentication credentials to the Game Provider 103.

Optionally, and preferably for either embodiment (400 and 401') the player (403 thru 406) unique channels can be encrypted end-to-end, preferably using asymmetrical (public/private) encryption to encrypt a shared symmetrical encryption key (e.g., X.509 certificates and TLS). Thereby further ensuring the transmitted data's confidentiality, security, and integrity.

In the immortal words of polymath John von Neuman, "Anyone who attempts to generate random numbers by deterministic means is, of course, living in a state of sin." The casino game stream system Game Provider 103 portion is highly dependent on its RNG to ensure variance in its video scenes/streams as well as to determine the outcome of its drawings. However, the Game Provider 103 portion preferred RNG core is a Mersenne Twister pRNG algorithm, which is a deterministic pseudorandom number generator.

A Mersenne Twister Pseudorandom Number Generator (pRNG) algorithm is preferred because of its relative simplicity, ease of implementation, well-known acceptable pseudorandom output over a period of 219937, and forensic audit capabilities given its starting seed(s). The Mersenne Twister algorithm is based on a matrix linear recurrence over a finite binary field producing a pseudorandom output that would pass most tests for randomization over the period of 219937 cycles. The matrix linear recurrence of the Mersenne Twister algorithm is dependent on its starting seeds (numerical inputs) and will output a sequence of random appearing numbers based on the starting seeds for the entire period of 219937 cycles. Thus, in theory, the Mersenne Twister algorithm output could be predicted by an adversary if its starting seeds were known.

The casino game stream system preferably overcomes this theoretical security complication of the Mersenne Twister algorithm 505 (FIG. 5) principally by periodically reseeding its starting seed and cryptographically hashing (e.g., Secure Hash Algorithm One or "SHA-1") and combining 506 multiple outputs of the 32-bit Mersenne Twister algorithm. The cryptographic hashing 506 of the Mersenne Twister algorithm 505 output partially obfuscates the algorithm's internal state from any adversarial observer. Additionally, an 8:1 Input-to-Output (I/O) ratio 506 further obfuscates the algorithm's output—i.e., every five pseudorandom 32-bit integers outputted by the RNG 502 require forty 32-bit hashed pseudorandom output integers from the Mersenne Twister algorithm 505.

Figure 5:
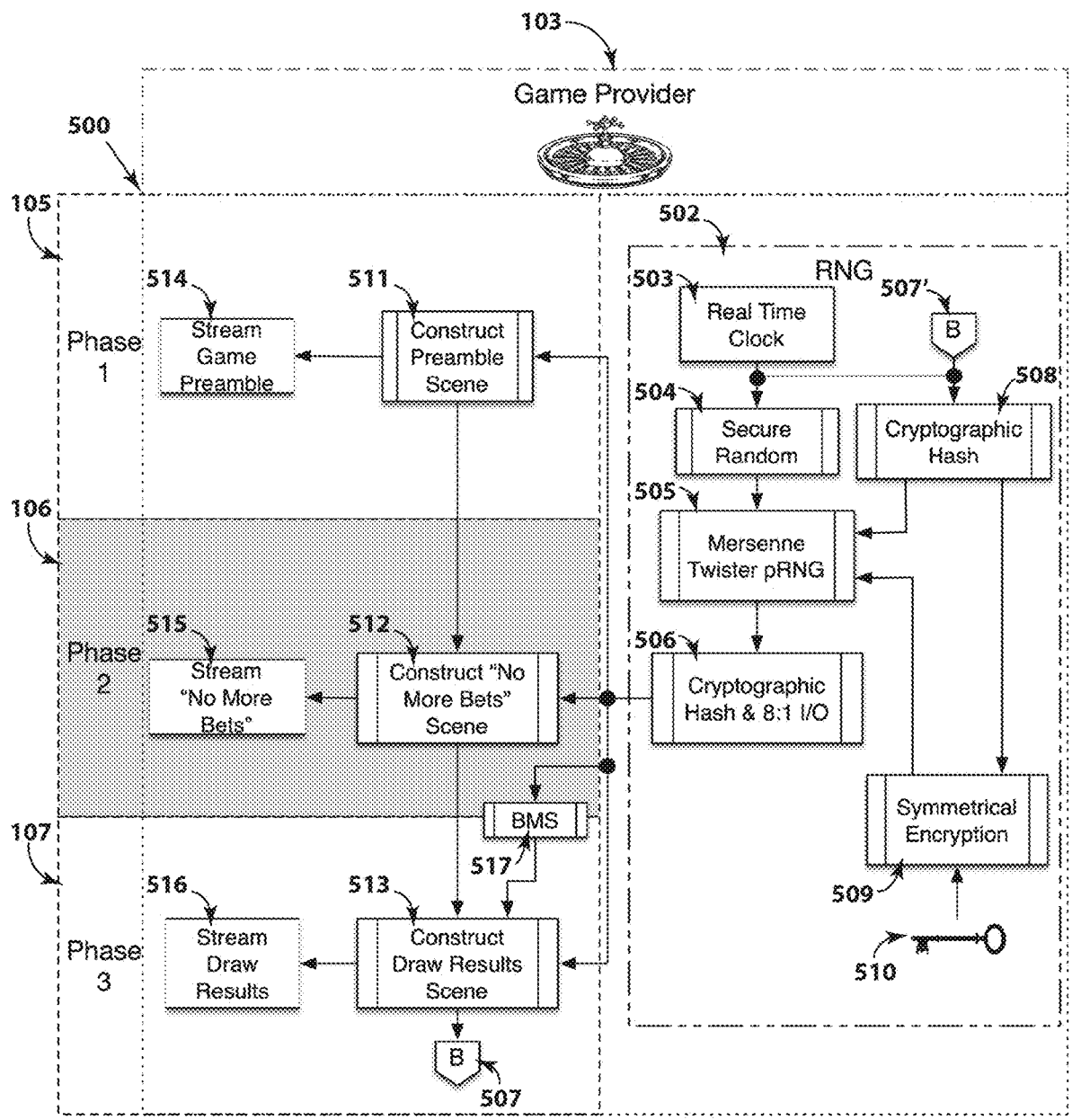
FIG. 5 is a partial swim lane block diagram representative example providing a detailed schematic graphical overview of the RNG of FIGS. 1A thru 1D and 3A thru 3C associated with selecting the draw game results as well as ensuring variance in the selection of video fragments for scenes.

For example, FIG. 5 illustrates 500 several embodiments utilizing the Mersenne Twister pRNG algorithm 505 as the core component for the Game Provider 103 RNG 502, which provides inputs to the BMS 517 and the three phases (105 thru 107) of scene construction algorithms (511 thru 513) streaming video to the players (514 thru 516). All embodiments cryptographically hash and apply an 8:1 I/O ratio 506 to all integer outputs from the Mersenne Twister pRNG algorithm 505. The differences between the various embodiments illustrated in FIG. 5 are primarily in reseeding the Mersenne Twister pRNG algorithm 505.

In a preferred embodiment, the RNG 502 Mersenne Twister pRNG algorithm 505 is seeded in real time 503 (e.g., once every minute) using the operating system Java SecureRandom 504 function to reseed the Mersenne Twister pRNG algorithm 505 periodically. The Java SecureRandom 504 function is preferred for this periodic reseeding process since it complies with the statistical random number generator tests specified in FIPS 140-2 (Federal Information Processing Standards of the US), Security Requirements for Cryptographic Modules, section 4.9.1. Optionally, a portion (e.g., milliseconds) of the actual Real Time Clock 503 can also be combined (e.g., Exclusive-OR or "X-OR") with the Java SecureRandom 504 output to potentially introduce more entropy into the Mersenne Twister pRNG algorithm 505 reseeding process.

In an alternative embodiment, the RNG 502 Mersenne Twister pRNG algorithm 505 is reseeded periodically using the Java SecureRandom 504 output in synchronization with game video scene construction. With this alternative embodiment, whenever the construction of a specific scene begins or completes (e.g., phase three 107 draw results scene 513 is completed) the event sends a signal (507 and 507') to the Java SecureRandom 504 function, causing it to reseed the Mersenne Twister pRNG algorithm 505. This alternative embodiment has the advantage of possibly ensuring that each game is generated with the same Mersenne Twister pRNG algorithm 505 seed while also ensuring that all games have different Mersenne Twister pRNG algorithm 505 seeds.

In another alternative embodiment, the RNG 502 Mersenne Twister pRNG algorithm 505 is reseeded periodically with a Cryptographic Hash 508 (e.g., SHA-1) of the previous game video stream(s). Optionally, the previous game video stream(s) can be combined with a Real Time Clock time tag to produce a Cryptographic Hash 508 reseed that is a function of both time and the previous game video stream(s). In still another alternative embodiment, the Cryptographic Hash 508 output can be encrypted 509 with a secret key 510 with the resulting ciphertext used to reseed the Mersenne Twister pRNG algorithm 505. This last alternative embodiment has the advantage that no one (even an insider to the Game Provider 103 system) could predict each reseed so long as the encryption key 510 remains unknown.

Thus, the Java SecureRandom 504, Cryptographic Hash 508, and Encryption 509 modules all function as different types of seed generators periodically supplying the preferred Mersenne Twister pRNG algorithm 505 with new starting seeds consequentially altering its deterministic output pattern whenever a new seed is generated. Of course, as is apparent to one skilled in the art, these various disclosed embodiments can be combined to create other embodiments not explicitly disclosed above. Also, a Linear Congruential Generator (LCG) pRNG algorithm could be utilized instead of the preferred Mersenne Twister pRNG algorithm 505 producing similar results, though typically with a much shorter period and less entropy. Additionally, a hardware True Random Number Generator (TRNG) could be used instead of or for reseeding the Mersenne Twister pRNG algorithm 505 with the advantage of a true source of informational entropy and the disadvantages of higher costs and increased complexity.

The Video Controller/Scheduler 120 described above is also interchangeably referred to herein as a "controller."

Various embodiments of the present invention use the BMS (game computer module, also, interchangeably referred to herein as a "game computer") for performing respective functions discussed above. The controller and the game computer module are in electronic communication with each other to perform their respective functions.

It should be appreciated by those skilled in the art in view of this description that various modifications and variations may be made present invention without departing from the scope and spirit of the present invention. It is intended that the present invention include such modifications and variations as come within the scope of the appended claims.

What is claimed is:

1. A method for creating a plurality of different video scenes simulating a broadcasted draw game in which players submit wagers for the broadcasted draw game via their respective player devices, wherein a video store database maintains a plurality of video fragments representing differing video takes, each broadcasted draw game having a game outcome, the method comprising:
    (a) receiving, at a controller, one or more player preferences from one of the player devices regarding portions of video fragments of the broadcasted draw game that do not affect the outcome of the broadcasted draw game;
    (b) culling, by the controller, portions of video fragments from the video store database to match the one or more player preferences;
    (c) constructing, by the controller, at least one scene comprised of pseudorandomly arranged video fragments by:
        (i) pseudorandomly selecting a set of video fragments from the culled portion of video fragments from the video store database to comply with the one or more player preferences using a Random Number Generator (RNG);
        (ii) seamlessly stitching the pseudorandomly selected set of video fragments into a playlist file of the at least one scene; and
        (iii) streaming the playlist file of the at least one scene to the player device that sent the one or more player preferences to the controller;
    thereby simulating a broadcasted draw game in which a player influences the visual appearance of the broadcasted draw game without affecting the outcome of the broadcasted draw game.

2. The method of claim 1 wherein all players receive the same streaming playlist file of the at least one scene to their respective player devices that is constructed in step (c).

3. The method of claim 1 wherein the playlist files are dynamic m3u8 files.

4. The method of claim 3 wherein the playlist files vary in length depending on the one or more player preferences.

5. The method of claim 1 wherein the RNG is a True Random Number Generator (TRNG).

6. A method for creating a plurality of different phased video scenes simulating a broadcasted draw game in which players submit wagers for the broadcasted draw game via their respective player devices, wherein a video store database maintains a plurality of video fragments representing differing video takes, each broadcasted draw game having a game outcome, the method comprising:
    (a) receiving, at a controller, one or more player preferences from a plurality of the player devices regarding portions of video fragments of the broadcasted draw game that do not affect the outcome of the broadcasted draw game;

(b) selecting the one or more player preferences to be used in the broadcasted draw game from the one or more player preferences received from the plurality of the player devices by voting for each of the one or more player preferences based on the most popular player preferences for each of the one or more player preferences;

(c) culling, by the controller, portions of video fragments from the video store database to match the most popular one or more player preferences;

(d) constructing, by the controller, at least one scene comprised of pseudorandomly arranged video fragments by:

(i) pseudorandomly selecting a set of video fragments from the culled portion of video fragments from the video store database to comply with the most popular one or more player preferences using a Random Number Generator (RNG);

(ii) seamlessly stitching the pseudorandomly selected set of video fragments into a playlist file of the at least one scene; and (iii) streaming the playlist file of the at least one scene to the player devices that sent the one or more player preferences to the controller, each player device receiving the same streamed playlist file of the at least one scene;

thereby simulating a broadcasted draw game in which a plurality of players influence the visual appearance of the broadcasted draw game without affecting the outcome of the broadcasted draw game.

7. The method of claim 6 wherein the playlist files are dynamic m3u8 files.

8. The method of claim 7 wherein the playlist files vary in length depending on the one or more player preferences.

9. The method of claim 6 wherein a chat platform is associated with the broadcasted draw game, thereby allowing player devices to share their respective player preferences via the chat platform.

10. The method of claim 6 wherein the RNG is a True Random Number Generator (TRNG).

11. An apparatus for creating a plurality of different video scenes simulating a broadcasted draw game in which players submit wagers for the broadcasted draw game via their respective player devices, wherein a video store database maintains a plurality of video fragments representing differing video takes, each broadcasted draw game having a game outcome, the apparatus comprising:

(a) a gaming platform for executing the broadcasted draw game, each player having a player device with an electronic connection to the gaming platform; and (b) a controller in communication with the gaming platform configured to:

(i) receive one or more player preferences from one of the player devices regarding portions of video fragments of the broadcasted draw game that do not affect the outcome of the broadcasted draw game, (ii) cull portions of video fragments from the video store database to match the one or more player preferences, and (iii) construct at least one scene comprised of pseudorandomly arranged video fragments by:

(A) pseudorandomly selecting a set of video fragments from the culled portion of video fragments from the video store database to comply with the one or more player preferences using a Random Number Generator (RNG);

(B) seamlessly stitching the pseudorandomly selected set of video fragments into a playlist file of the at least one scene; and (C) streaming the playlist file of the at least one scene to the player device that sent the one or more player preferences to the controller;

thereby simulating a broadcasted draw game in which a player influences the visual appearance of the broadcasted draw game without affecting the outcome of the broadcasted draw game.

12. The apparatus of claim 11 wherein all players receive the same streaming playlist file of the at least one scene to their respective player devices that is constructed.

13. The apparatus of claim 11 wherein the playlist files are dynamic m3u8 files.

14. The apparatus of claim 13 wherein the playlist files vary in length depending on the one or more player preferences.

15. The apparatus of claim 11 wherein the RNG is a True Random Number Generator (TRNG).

16. An apparatus for creating a plurality of different phased video scenes simulating a broadcasted draw game in which players submit wagers for the broadcasted draw game via their respective player devices, wherein a video store database maintains a plurality of video fragments representing differing video takes, each broadcasted draw game having a game outcome, the apparatus comprising:

(a) a gaming platform for executing the broadcasted draw game, each player having a player device with an electronic connection to the gaming platform; and (b) a controller in communication with the gaming platform configured to:

(i) receive one or more player preferences from a plurality of the player devices regarding portions of video fragments of the broadcasted draw game that do not affect the outcome of the broadcasted draw game, (ii) select the one or more player preferences to be used in the broadcasted draw game from the one or more player preferences received from the plurality of the player devices by voting for each of the one or more player preferences based on the most popular player preferences for each of the one or more player preferences, (iii) cull portions of video fragments from the video store database to match the most popular one or more player preferences, and (iv) construct at least one scene comprised of pseudorandomly arranged video fragments by:

(A) pseudorandomly selecting a set of video fragments from the culled portion of video fragments from the video store database to comply with the most popular one or more player preferences using a Random Number Generator (RNG);

(B) seamlessly stitching the pseudorandomly selected set of video fragments into a playlist file of the at least one scene; and (C) streaming the playlist file of the at least one scene to the player devices that sent the one or more player preferences to the controller, each player device receiving the same streamed playlist file of the at least one scene, thereby simulating a broadcasted draw game in which a plurality of players influence the visual appearance of the broadcasted draw game without affecting the outcome of the broadcasted draw game.

17. The apparatus of claim 16 wherein the playlist files are dynamic m3u8 files.

18. The apparatus of claim 17 wherein the playlist files vary in length depending on the one or more player preferences.

19. The apparatus of claim 16 further comprising:
(c) a chat platform associated with the broadcasted draw game, the chat platform allowing player devices to share their respective player preferences via the chat platform.

20. The apparatus of claim 16 wherein the RNG is a True Random Number Generator (TRNG).

\* \* \* \* \*